United States Patent
Lee

(10) Patent No.: US 9,641,471 B2
(45) Date of Patent: May 2, 2017

(54) ELECTRONIC DEVICE, AND METHOD AND COMPUTER-READABLE RECORDING MEDIUM FOR DISPLAYING MESSAGE IN ELECTRONIC DEVICE

(71) Applicant: Samsung Electronics Co., Ltd., Suwon-si, Gyeonggi-do (KR)

(72) Inventor: Byung-Hee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 14/300,798

(22) Filed: Jun. 10, 2014

(65) Prior Publication Data
US 2015/0121255 A1 Apr. 30, 2015

(30) Foreign Application Priority Data

Oct. 31, 2013 (KR) .................. 10-2013-0131214

(51) Int. Cl.
 G06F 3/048 (2013.01)
 H04L 12/58 (2006.01)
 G06Q 10/10 (2012.01)

(52) U.S. Cl.
 CPC ............. *H04L 51/10* (2013.01); *G06Q 10/10* (2013.01)

(58) Field of Classification Search
 CPC ..... G06F 17/211; G07F 17/32; G07F 17/3262
 See application file for complete search history.

(56) References Cited

U.S. PATENT DOCUMENTS

| 7,386,799 | B1 * | 6/2008 | Clanton | A63F 13/12 |
| | | | | 715/753 |
| 8,331,981 | B2 | 12/2012 | Lewis | |
| 9,207,835 | B1 * | 12/2015 | Yang | H04L 51/046 |
| 2002/0109719 | A1 * | 8/2002 | Hata | G06T 17/00 |
| | | | | 715/748 |
| 2008/0034295 | A1 * | 2/2008 | Kulas | H04N 9/8227 |
| | | | | 715/723 |

(Continued)

FOREIGN PATENT DOCUMENTS

| KR | 10-0499769 B1 | 7/2005 |
| KR | 10-2013-0012250 A | 2/2013 |

(Continued)

OTHER PUBLICATIONS

Anonymous, Facebook Symbols and Chat Emoticons: New Symbols for Facebook Comments, Jun. 22, 2013, XP055215415, Retrieved from the Internet: URL: https://web.archive.org/web/20130622232504/http://www.symbols-n-emoticons.com/2013/05/new-symbols-for-facebook-comments.html? [retrieved on Sep. 22, 2015].

(Continued)

*Primary Examiner* — William Bashore
*Assistant Examiner* — Rayeez Chowdhury
(74) *Attorney, Agent, or Firm* — Jefferson IP Law, LLP

(57) ABSTRACT

A method of displaying a message on a chat window is provided. The method includes selecting a cartoon image group including a plurality of cartoon cut images, receiving a chat content, selecting a cartoon cut image from the selected cartoon cut image group, and displaying the selected cartoon cut image including the received chat content in some areas of the selected cartoon cut image on a messenger chat window.

39 Claims, 19 Drawing Sheets

(56) References Cited

U.S. PATENT DOCUMENTS

| | | | |
|---|---|---|---|
| 2008/0068385 A1* | 3/2008 | Kim ................. | G06F 17/30905 |
| | | | 345/472 |
| 2010/0162133 A1* | 6/2010 | Pascal ............... | H04M 1/72547 |
| | | | 715/752 |
| 2011/0212749 A1* | 9/2011 | Lewis ..................... | H04N 7/14 |
| | | | 455/556.1 |
| 2012/0017159 A1* | 1/2012 | Roh ................... | G06F 3/04812 |
| | | | 715/760 |
| 2012/0157134 A1* | 6/2012 | Lee ...................... | H04L 12/583 |
| | | | 455/466 |
| 2012/0327183 A1* | 12/2012 | Fujii .................. | H04L 12/1827 |
| | | | 348/14.12 |
| 2013/0002683 A1* | 1/2013 | Li ......................... | G06F 17/211 |
| | | | 345/473 |
| 2013/0275531 A1* | 10/2013 | Hahm .................... | H04W 4/12 |
| | | | 709/206 |

FOREIGN PATENT DOCUMENTS

| | | | |
|---|---|---|---|
| WO | 2004/095308 A1 | 11/2004 | |
| WO | 2006/129967 A1 | 12/2006 | |
| WO | 2013/151384 A1 | 10/2013 | |

OTHER PUBLICATIONS

Making the New Facebook Chat Smileys Using a Computer, Jun. 24, 2013, XP054976080, Retrieved from the Internet: URL: https://www.youtube.com/watch?v=6JzBUFLkqdo [retrieved on Sep. 23, 2015].

\* cited by examiner

ELECTRONIC DEVICE, AND METHOD AND COMPUTER-READABLE RECORDING MEDIUM FOR DISPLAYING MESSAGE IN ELECTRONIC DEVICE

CROSS-REFERENCE TO RELATED APPLICATION(S)

This application claims the benefit under 35 U.S.C. §119 (a) of a Korean patent application filed on Oct. 31, 2013 in the Korean Intellectual Property Office and assigned Ser. No. 10-2013-0131214, the entire disclosure of which is hereby incorporated by reference.

TECHNICAL FIELD

The present disclosure relates to an electronic device, and a method and a computer-readable recording medium for displaying a message in a messenger service provided through an electronic device.

BACKGROUND

Recently, users who desire to use various modes of communication communicate through a website, an e-mail, a phone, and the like. However, communication over e-mail has a relatively low real time capability, and communication over phone has high associated communication cost in spite of a relatively high real time capability.

Meanwhile, an instant messenger is a method useful for real time transmission of information using the Internet. An object of the instant messenger is to exchange a simple message between users in real time. In communication using instant messenger, two users may communicate in real time through a text message as though the two users directly talk to each other. The relatively real time communication of communication using instant messenger is a result of the instant messenger immediately transmitting input contents based on importance of the real time capability.

However, a messenger according to the related art provides a function of using an emoticon, a sticker, and/or the like as a method of expressing a fun factor of the communication or feelings of the user. However, in the messenger according to the related art, the emoticon, the sticker, and/or the like is separately displayed from a received/transmitted message, or only a combination in a simple level is provided. Consequently, a user's various demands may not be satisfied.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure may provide a method and a computer-readable recording medium for displaying a messenger chat window using a cartoon image which can be displayed in a cartoon image form when a messenger chat content is displayed on a screen.

In accordance with an aspect of the present disclosure, a method of displaying a message on a chat window is provided. The method includes selecting a cartoon image group including a plurality of cartoon cut images, receiving a chat content, selecting a cartoon cut image from the selected cartoon cut image group, and displaying the selected cartoon cut image including the received chat content in some areas of the selected cartoon cut image on a messenger chat window.

In accordance with another aspect of the present disclosure, a method of displaying a message on a chat window is provided. The method includes selecting a cartoon frame in which a plurality of cartoon cut images are arranged in a preset order, inputting a chat content into a messenger chat window, sequentially selecting cartoon cut images from the selected cartoon frame according to an order of the arrangement of the plurality of cartoon cut images; and displaying the selected cartoon cut image including the input chat content in some areas of the selected cartoon cut image on the messenger chat window.

In accordance with another aspect of the present disclosure, a method of displaying a messenger chat window using a cartoon image is provided. The method includes selecting a cartoon frame in which a plurality of cartoon cut images are arranged according to a predetermined order, inputting a message into a messenger chat window, sequentially selecting cartoon cut images from the selected cartoon frame according to an order of the arrangement of the plurality of cartoon cut images, generating a combined cut image by adding the input message to a message displaying area of the selected cartoon cut image, and displaying the generated combined cut image on the messenger chat window.

In accordance with another aspect of the present disclosure, a method of displaying a conversation on a chat window in an electronic device is provided. The method includes receiving an input message, selecting a cartoon cut image to be displayed in association with the received input message, and displaying the selected cartoon cut image and the received input message in a messenger chat window.

In accordance with another aspect of the present disclosure, information on the method of displaying the messenger chat window using the cartoon image may be stored in a non-transitory computer-readable recording medium. The non-transitory computer-readable recording medium includes all types of recording media that store programs and data readable by a computer system. Examples of the non-transitory computer-readable recording media include a Read Only Memory (ROM), a Random Access Memory (RAM), a Compact Disk (CD), a Digital Video Disk (DVD)-ROM, a magnetic tape, a floppy disk, an optical data storage device, an Embedded MultiMedia Card (eMMC), and/or the like, and also include media implemented in a form of carrier wave (e.g., transmission through Internet). Further, the non-transitory computer-readable recording media may store and execute codes distributed to a computer system connected through a network and readable by a computer in a distributed manner.

According to various embodiments of the present disclosure, enjoyability of a chat can be improved by displaying a messenger chat content as a cartoon image.

Further, according to various embodiments of the present disclosure, creating new animation works by a combination of cartoon images generated through a messenger chat and creating additional profit by selling an original animation or related products may be possible.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
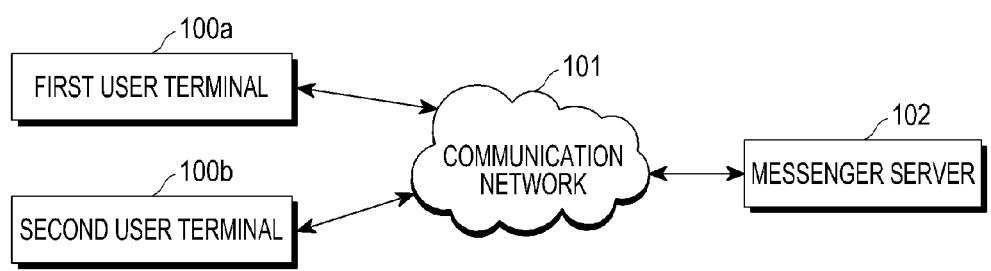
FIG. 1 illustrates a structure of a messenger system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in this application is for the purpose of describing particular embodiments only and is not intended to be limiting of the disclosure. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include communication functionality. For example, an electronic device may be a smart phone, a tablet Personal Computer (PC), a mobile phone, a digital camera, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), a game machine, a head unit for a vehicle, an Automated Teller Machine (ATM) of a bank, a POS device of a shop, a flexible device, a flexible display device, and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a user terminal may be an electronic device.

Embodiments of the present disclosure disclose a method and an apparatus for displaying a messenger chat window using a cartoon image which can express chat contents in the form of the cartoon image when the chat contents of the messenger are displayed on a screen. For example, according to various embodiments of the present disclosure, the chat contents of the messenger may be combined to be included in a cartoon cut image and displayed on the messenger chat window.

According to various embodiments of the present disclosure, a cartoon cut may refer to a single cut image generated in the unit of chats. Further, according to various embodiments of the present disclosure, a cartoon frame may refer to an image including a plurality of cartoon cuts (e.g., an image configuring a cartoon page).

Hereinafter various embodiments of the present disclosure will be described in detail with reference to the accompanying drawings in order that those skilled in the art to which the present disclosure pertains may readily carry out the present disclosure.

FIG. 1 illustrates a structure of a messenger system according to an embodiment of the present disclosure.

Referring to FIG. 1, according to various embodiments of the present disclosure, the messenger system may include user terminals 100, a communication network 101, and a messenger server 102. When each of the user terminals 100 makes a request for chatting with another user, the messenger server 102 performs a function of identifying the presence of a counterpart user terminal, generating a chat channel therebetween, and then providing a messenger service. Accordingly, when a chat channel between a first user terminal 100a and a second user terminal 100b is generated, a message transmitted from each of the terminals is transmitted to a corresponding counterpart user terminal through the messenger server 102.

According to various embodiments of the present disclosure, the message made by each of the user terminals 100 may be displayed as a cartoon image in a messenger chat window of each of the counterpart user terminals 100.

According to various embodiments of the present disclosure, the cartoon image displayed on the messenger chat window may be a cartoon image selected from images stored in the user terminal 100 or a cartoon image provided through the messenger server 102.

For example, according to various embodiments of the present disclosure, in order to display the cartoon image on the messenger chat window, each of the user terminals 100 (e.g., first user terminal 100a and second user terminal 100b) downloads a cartoon image group including a plurality of cartoon cut images from the messenger server 102 in advance, selects or receives a recommendation of a particular cartoon cut included in the downloaded cartoon image group whenever a message is input, and then displays the corresponding cartoon cut image on the messenger chat window.

According to various embodiments of the present disclosure, the communication network 101 may be implemented regardless of an aspect of communication such as wired/wireless communication, and may be implemented by various communication networks including a Personal Area Network (PAN), a Local Area Network (LAN), a Metropolitan Area Network (MAN), a Wide Area Network (WAN), and/or the like. Further, the communication network 101 may be a known World Wide Web (WWW), and may use a wireless transmission technology utilized for the PAN such as Infrared Data Association (IrDA), Bluetooth, WiFi Direct, and/or the like.

Figure 2:
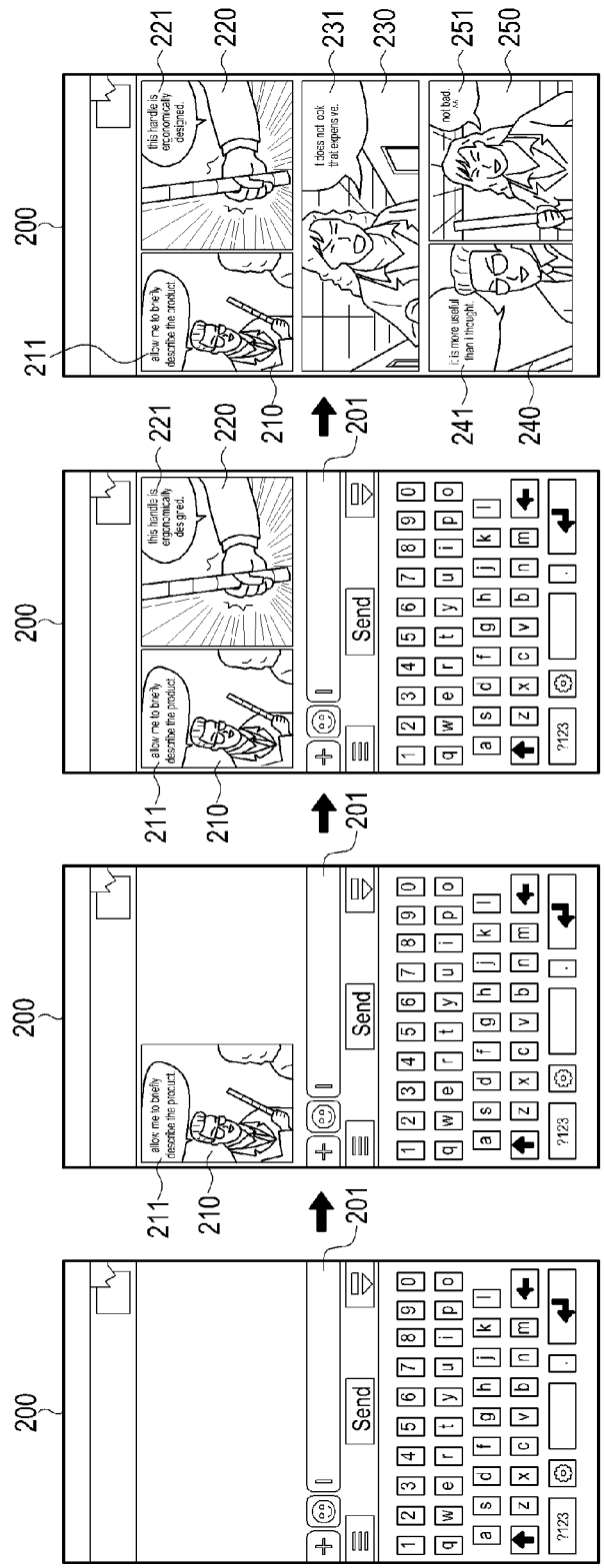
FIG. 2 illustrates a messenger chat window displaying screen using a cartoon image according to an embodiment of the present disclosure.

FIG. 2 illustrates a messenger chat window displaying screen using a cartoon image according to an embodiment of the present disclosure.

Referring to FIG. 2, when a message is input into a messenger chat window 200 through a message input unit 201, the input message is added to a cartoon cut image 210 and the carton cut image including the message is displayed on a chat content displaying area of the messenger chat window 200.

For example, as illustrated in FIG. 2, a message content input through the message input unit 201 is added within a text displaying area (e.g., a speech bubble area) 211 of the cartoon cut image 210 and the cartoon cut image including the message content is displayed on the messenger chat window 200.

At this time, one cartoon cut image is mapped and displayed in the unit of message inputs (e.g., the unit in which the message is input through the message input unit 201 and then a send button is pressed). Accordingly, messenger users increase a fun factor of the chat by displaying a text on the screen in the form of a cartoon even though the messenger users input only text in order to communicate with (e.g., talk to) each other.

According to various embodiments of the present disclosure, the cartoon cut image may be displayed in an order of message inputs or sequentially displayed according to messages alternately input by chat users, or a plurality of cartoon cut images may be consecutively displayed with respect to messages successively input by the same user.

Further, although FIG. 2 illustrates a case in which two chat room participants communicate with (e.g., talk to) each other as an example, various embodiments of the present disclosure may be applied to a group chatting including three or more people.

Accordingly, when a chat is made using a carton cut image according to various embodiments of the present disclosure, cartoon cut images are sequentially generated according to message inputs and displayed on the messenger chat window. For example, when a first message is first input, the first message 211 is added to and displayed on the message displaying area 211 of the first cartoon cut image 210. Next, when a second message is input, the second message 221 is added to and displayed on a message displaying area of a second cartoon cut image 220. When a third message is input in the same way, the third message 231 is added to and displayed on a message displaying area of a third carton cut image 230. When a fourth message is input, the fourth message 241 is added to and displayed on a message displaying area of a fourth cartoon cut image 240. When a fifth message is input, the fifth message 251 is added to and displayed on a message displaying area of a fifth cartoon cut image 250.

As described above, when the five cartoon cut images 210 to 250 are displayed, the five cartoon cut images 210 to 250 may become one cartoon page. Accordingly, cartoon cut images generated according to the messenger chat may be stored in a database in the unit of pages and pre-stored carton cut images may be read in the unit of pages.

Hereafter a process of generating the cartoon cut image according to various embodiments of the present disclosure will be described with reference to FIGS. 3 to 7.

Figure 3:
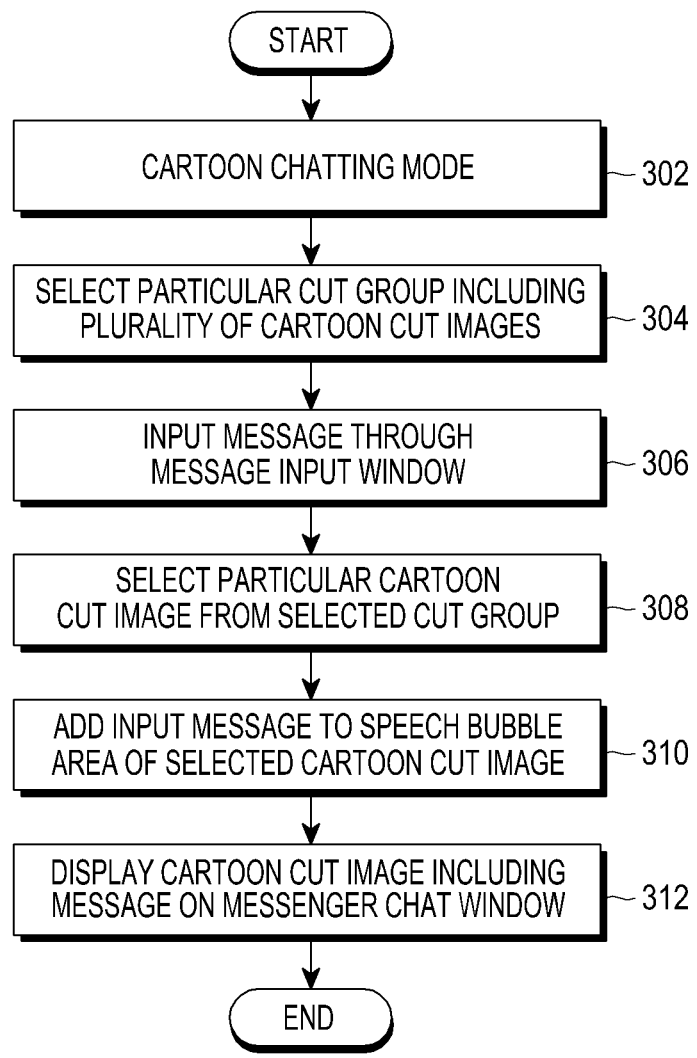
FIG. 3 is a flowchart illustrating a process of displaying a messenger chat window using a cartoon image according to an embodiment of the present disclosure.

FIG. 3 is a flowchart illustrating a process of displaying a messenger chat window using a cartoon image according to an embodiment of the present disclosure.

Referring to FIG. 3, at operation 302 a cartoon chatting mode is set. According to various embodiments of the present disclosure, the cartoon chatting mode is a mode in which a chat content is displayed as a cartoon cut image.

At operation 304, a cartoon cut image group including a plurality of cartoon cuts may be selected. Information on the cartoon cut image group may be downloaded in advance from an external server and then used.

At operation 306, the user inputs a chat content (e.g., message) through a chat content input area (e.g., message input unit such as, for example, a message input window) of a messenger chat window.

At operation 308, one or more cartoon cut images is selected from the selected cartoon cut image group.

At operation 310, the input chat content (message) is added to some area (e.g., a message displaying area such as, for example, a speech bubble area) of the selected cartoon cut image.

At operation 312, the cartoon cut image including the input chat content may be displayed on the messenger chat window.

Further, according to various embodiments of the present disclosure, when the user first selects a particular cartoon cut image from the selected cartoon cut image group and inputs a message into the messenger chat window through an input unit (e.g., a message input window), at operation 310, the input message is added to the message displaying area (e.g., the speech bubble area) of the selected cartoon cut image, and at operation 312, the cartoon cut image including the input message is displayed on the messenger chat window.

According to various embodiments of the present disclosure, a method of adding the input message to the cartoon cut image may be variously implemented. For example, a new image may be generated by combining the input message and the cartoon cut image. Further, the cartoon cut image and the input message are configured by different layers and then the two layers may be overlappingly displayed.

Figure 4:
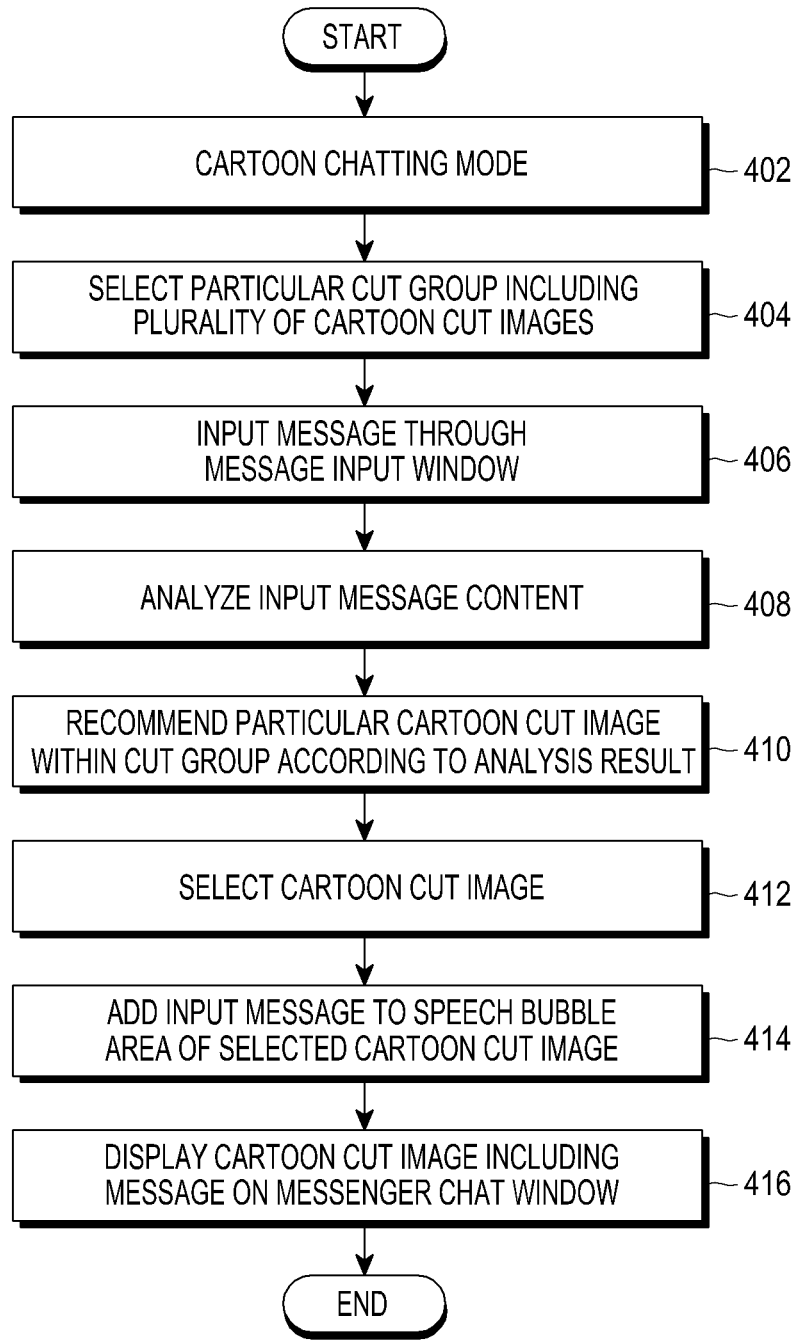
FIG. 4 is a flowchart illustrating a process of displaying a messenger chat window by a cartoon cut recommendation according to an embodiment of the present disclosure.

FIG. 4 is a flowchart illustrating a process of displaying a messenger chat window by a cartoon cut recommendation according to an embodiment of the present disclosure.

Referring to FIG. 4, at operation 402, a cartoon chatting mode is set. According to various embodiments of the present disclosure, the cartoon chatting mode is a mode in which a chat content is displayed as a cartoon cut image.

At operation 404, a cartoon cut image group including a plurality of cartoon cuts may be selected. Information on the cartoon cut image group may be downloaded in advance from an external server and then used.

At operation 406, the user inputs a message into a messenger chat window through a message input unit (e.g., a message input window).

At operation 408, the input message content is analyzed.

At operation 410, one or more cartoon cut images are recommended from the selected cartoon cut image group according to a result of the analysis of the image message content. According to various embodiments of the present disclosure, a method of recommending the cartoon cut image may be variously implemented. For example, one or more keywords are extracted from the input message and a cartoon cut image closest to the extracted keyword is recommended.

At operation 412, a particular cartoon cut from the one or more recommended cartoon cut images may be selected. For example, the user may select the particular cartoon cut from the one or more recommended cartoon cut images.

At operation 414, the input message is added to a message displaying area (e.g., speech bubble area) of the selected cartoon cut image.

At operation 416, the cartoon cut image including the input message is displayed on the messenger chat window.

Further, according to various embodiments of the present disclosure, the method may be performed without operation 410 of FIG. 4. For example, when the user inputs a message into the messenger chat window through the message input unit (message input window) at operation 406, the method may proceed to operation 408 at which the input message content is analyzed, and one particular cartoon cut image may be automatically selected from the selected cartoon cut image group according to a result of the analysis.

Figure 5:
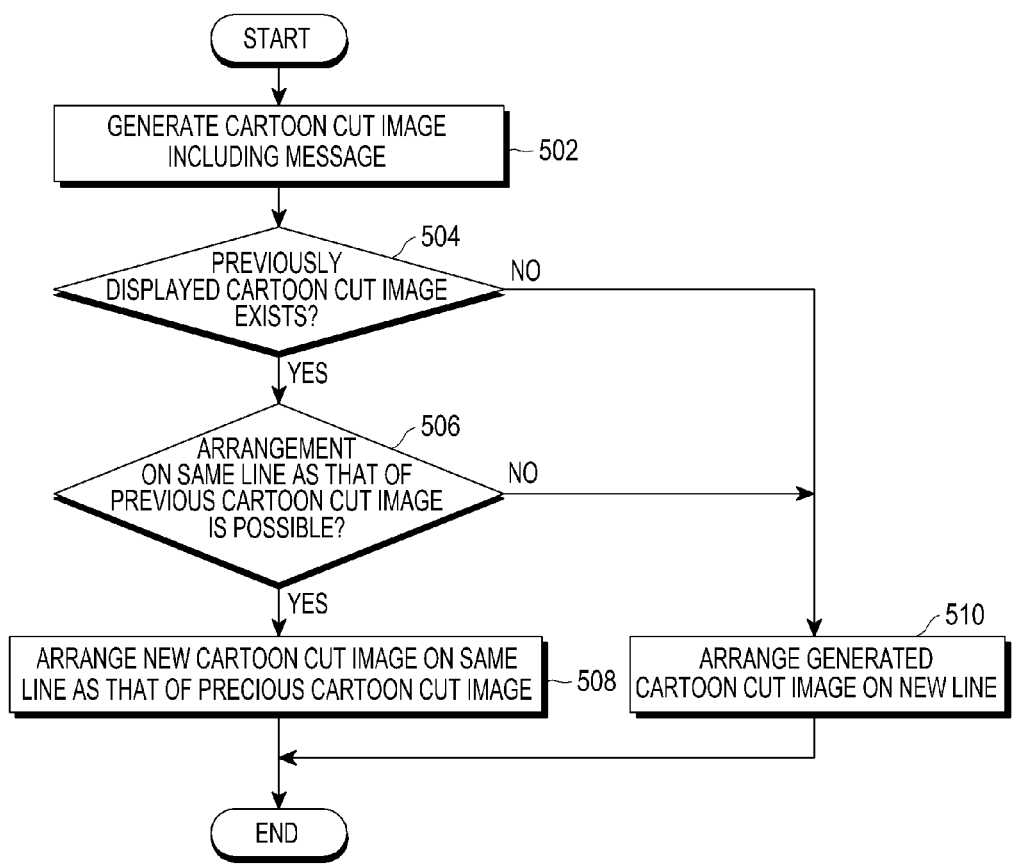
FIG. 5 is a flowchart illustrating a process of arranging cartoon cut images according to an embodiment of the present disclosure.

FIG. 5 is a flowchart illustrating a process of arranging cartoon cut images according to an embodiment of the present disclosure.

Referring to FIG. 5, at operation 502, a cartoon cut image, to which a message has been added, is generated according to the process of FIGS. 3 and 4.

At operation 504, an electronic device (e.g., a user terminal) determines whether the messenger chat window includes a previously displayed cartoon cut image.

If the electronic device determines that messenger window includes the previously displayed cartoon cut image at operation 504, then the electronic device proceeds to operation 506 at which the electronic device determines whether the cartoon cut image can be arranged at the same line as the line of a just previously displayed cartoon cut image. For example, because sizes of the cartoon cut images may be different from each other, as illustrated in FIG. 2, the electronic device may determine whether the cartoon cut image can be arranged at the same line as the line of a just previously displayed cartoon cut image. For example, according to various embodiments of the present disclosure, the cartoon cut images may be all arranged with the same size. According to various embodiments of the present disclosure, the cartoon cut images may be arranged with different sizes, as illustrated in FIG. 2. As described above, when the images having different sizes are arranged on the messenger chat window, one or more images may be arranged on the horizontally same line in parallel. Accordingly, when two or more images are arranged on the same line, the electronic device may determine whether a next image to be arranged in parallel can be arranged at a corresponding area.

Figure 8:
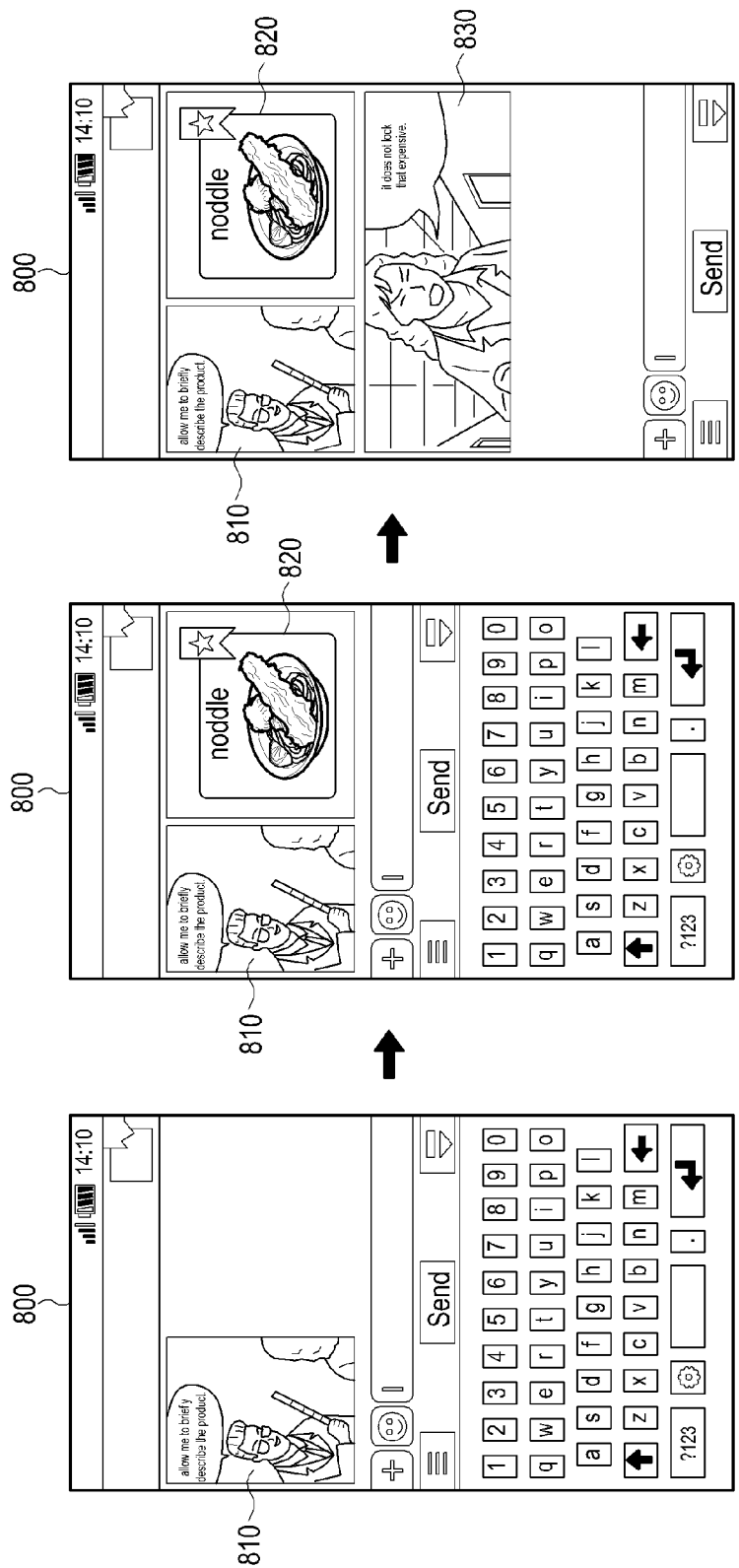
FIGS. 8 and 9 illustrate examples of screens in which an advertisement image is arranged at a cartoon cut according to an embodiment of the present disclosure.

For example, with reference to FIG. 2, when the first cartoon cut image 210 is selected and then the third cartoon cut image 230 is selected, the third cartoon cut image 230 cannot be arranged at the right of the first cartoon cut image 210 due to a size of the third cartoon cut image 230. Accordingly, a corresponding space is left empty (e.g., according to various embodiments of the present disclosure, at this time, advertisement information may be inserted into the empty space as illustrated in FIG. 8 described below) and the third cartoon cut image 230 may be arranged on the next line.

If the previously displayed cartoon cut exists and the electronic device determines that the next cartoon cut can be arranged on the same line as the line of the previous cartoon cut at operation 506, then the electronic device may proceed to operation 508 at which the new cartoon cut is arranged on the same line as the line of the previous cartoon cut.

In contrast, if the previously displayed cartoon cut is determined not to exist at operation 504 or if the electronic device determines that the next cartoon cut cannot be arranged on the same line as the line of the previous cartoon cut at operation 506, then the electronic device may proceed to operation 510 at which the generated cartoon cut may be arranged on a new line.

Figure 6:
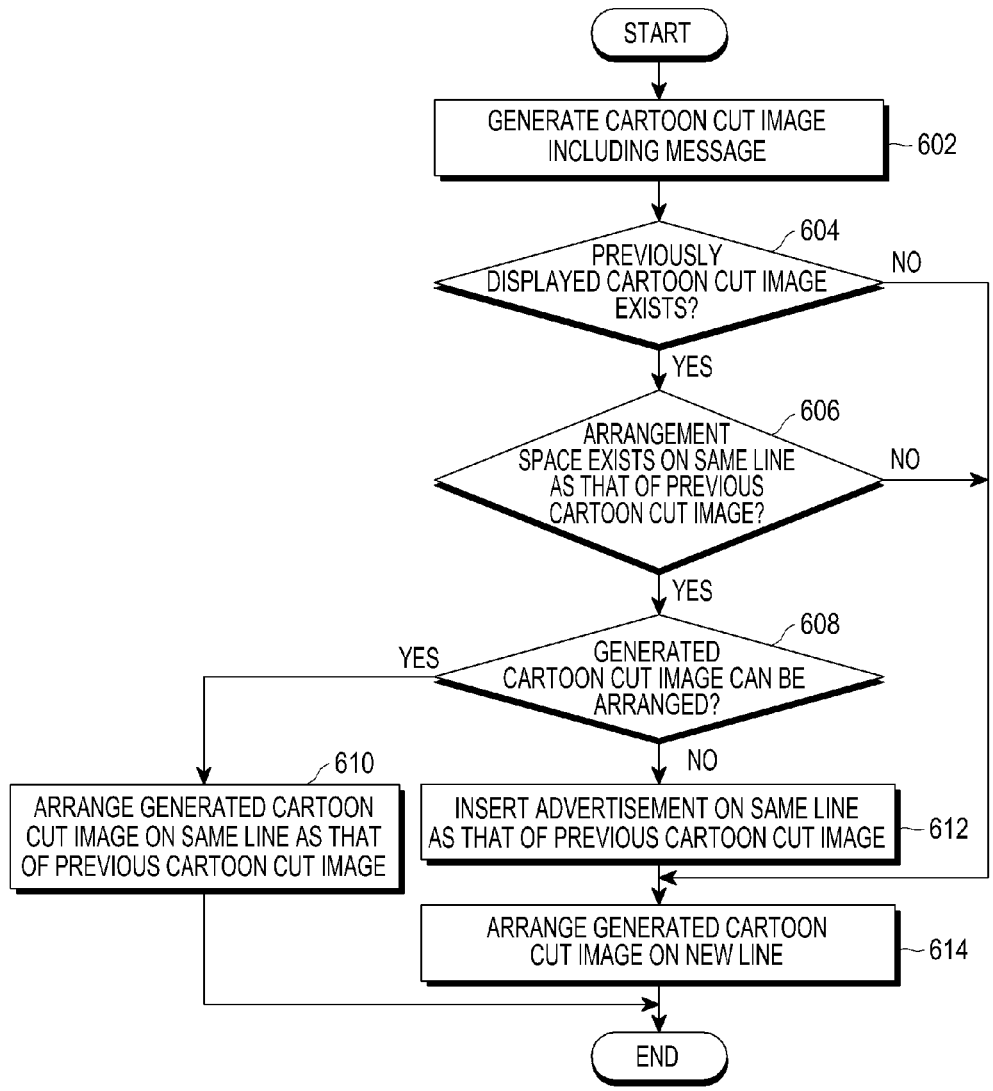
FIG. 6 is a flowchart illustrating a process of inserting an advertisement image according to an embodiment of the present disclosure.

FIG. 6 is a flowchart illustrating a process of inserting an advertisement image according to an embodiment of the present disclosure.

Referring to FIG. 6, at operation 602, a cartoon cut image, to which a message has been added, is generated according to the process of FIGS. 3 and 4.

At operation 604, an electronic device (e.g., a user terminal) determines whether the messenger chat window includes a previously displayed cartoon cut image.

If the electronic device determines that the messenger chat window includes the previously displayed cartoon cut image at operation 604, then the electronic device may proceed to operation 606 at which the electronic device determines whether the cartoon cut image can be arranged on the same line as the line of a just previously displayed cartoon cut image. For example, because sizes of the cartoon cut images may be different from each other, as illustrated in FIG. 2, the electronic device may determine whether the cartoon cut image can be arranged at the same line as the line of a just previously displayed cartoon cut image.

If the previously displayed cartoon cut image exists and the electronic device determines there to be an arrangement space on the same line as the line of the previous cartoon cut image at operation 606, then the electronic device may proceed to operation 608 at which the electronic device determines whether the newly generated cartoon cut image can be arranged on the same line as the line of the previous cartoon cut image.

If the electronic device determines that the newly generated cartoon cut image can be arranged on the same line as the line of the previous cartoon cut image at operation 608, then the electronic device may proceed to operation 610 at which the new cartoon cut image is arranged on the same line as the line of the previous cartoon cut image.

In contrast, if the electronic device determines that the newly generated cartoon cut image cannot be arranged on the same line as the line of the previous cartoon cut image at operation 608, then the electronic device may proceed to operation 612 at which an advertisement is inserted on the same line as the line of the previous cartoon cut image.

In contrast, if the electronic device determines that the messenger chat window does not include the previously displayed cartoon cut image at operation 604, then the electronic device may proceed to operation 614 at which the generated cartoon cut image may be arranged on a new line.

If the electronic device determines that the line of the previous cartoon cut image does not include an arrangement space for the newly generated cartoon cut image at operation 606, then the electronic device may proceed to operation 614 at which the generated cartoon cut image may be arranged on a new line.

Meanwhile, according to various embodiments of the present disclosure, when the line of the previous cartoon cut image includes an arrangement space for the newly generated cartoon cut image, or when the newly generated cartoon cut image cannot be arranged at the corresponding space, at operation 612, a preset (e.g., or automatically selected) advertisement information may be arranged at the arrangement space on the same line as the line of the previous cartoon cut image. Then, the generated cartoon cut image may be arranged on the new line in operation 614.

Figure 7:
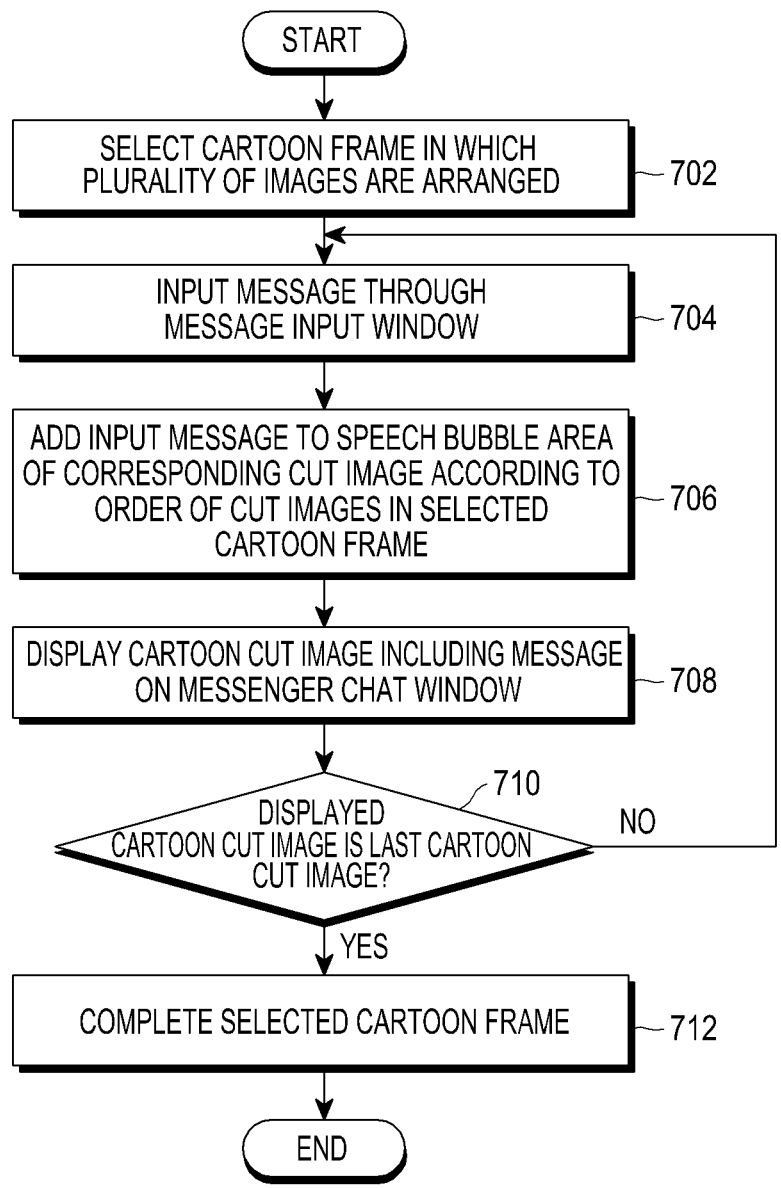
FIG. 7 is a flowchart illustrating a process of displaying a messenger chat window using a cartoon image according to an embodiment of the present disclosure.

FIG. 7 is a flowchart illustrating a process of displaying a messenger chat window using a cartoon image according to an embodiment of the present disclosure.

Referring to FIG. 7, according to various embodiments of the present disclosure, when a cartoon chatting mode, in which a chat content is displayed as a cartoon cut image, is set, at operation 702, the user may select a cartoon frame in which a plurality of cartoon cut images are pre-arranged according to a predetermined order. Information on the cartoon frame may be downloaded in advance from an external server and then used.

At operation 704, the user inputs a message into the messenger chat window through the message input unit (message input window).

At operation 706, an input message is added to a speech bubble area of a corresponding cartoon cut image according to an order of cartoon cut images in a selected cartoon frame. For example, at operation 706, cartoon cut images are sequentially selected from the selected cartoon frame according to the arrangement order and the input message may be added to a message displaying area (e.g., speech bubble area) of the corresponding selected cartoon cut image.

At operation 708, the cartoon cut image to which the message has been added may be displayed on the messenger chat window.

At operation 710, the electronic device determines whether the displayed cartoon cut image is a last cartoon cut image of the cartoon frame.

If the electronic device determines that the displayed cartoon cut image is the last cartoon cut image of the cartoon frame at operation 710, then the electronic device may proceed to operation 712 at which a configuration of the selected cartoon frame is completely processed and the configured cartoon frame may be stored. The stored cartoon frame may be read in the future and re-edited or output. Further, according to various embodiments of the present disclosure, the stored cartoon frame may be implemented to be transmitted to another user terminal or shared through a cloud server. In addition, according to various embodiments of the present disclosure, a plurality of cartoon frames may be gathered to have the form of a comic book. The configured comic book may be output to be made in the form of a book or may be transmitted to another user terminal in the unit of comic books.

Hereinafter various embodiments of the present disclosure in which the cartoon cut image is displayed on the messenger chat window will be described with reference to FIGS. 8 to 19.

Figure 9:
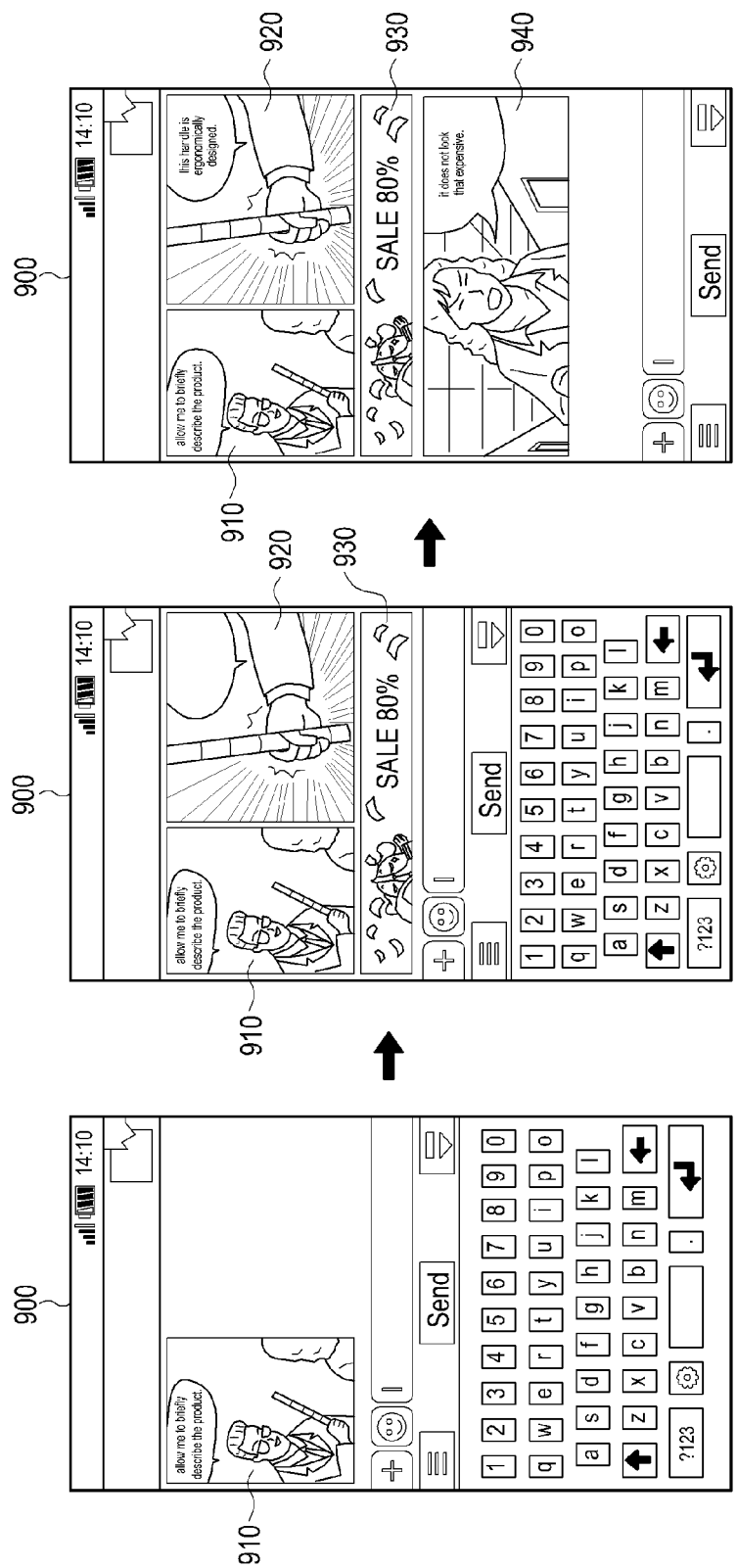

FIGS. 8 and 9 illustrate examples of screens in which an advertisement image is arranged at the cartoon cut according to an embodiment of the present disclosure.

Referring to FIG. 8, when a first cartoon cut image 810 is arranged on a messenger chat window 800 and then a second cartoon cut image 830 is selected to be arranged on the messenger chat window 800, the second cartoon cut image 830 may be arranged on the next line as illustrated in FIG. 8 because a right area of the first cartoon cut image 810 does not have an enough space to include the second cartoon cut image 830.

According to various embodiments of the present disclosure, the right area of the first cartoon cut image 810 may be left as an empty space or an advertisement image 820 may be added to the right area as illustrated in FIG. 8. As described above, the advertisement image may automatically inserted into the space which may be generated as the cartoon cut image selected by the user during the chat does not fit the arrangement space, so that an advertisement effect can be acquired.

Referring to FIG. 9, an advertisement image 930 may be added between lines on which cartoon cut images are arranged. For example, as illustrated in FIG. 9, after a first cartoon cut image 910 and a second cartoon cut image 920 are arranged on a messenger chat window 900 and before a third cartoon cut image 940 is arranged, the advertisement image 930 may be automatically added. An order of adding the advertisement image 930 may be randomly selected or follow a preset order. Further, the added advertisement information may be provided as a related target advertisement image by analyzing a messenger chat content.

Figure 10:
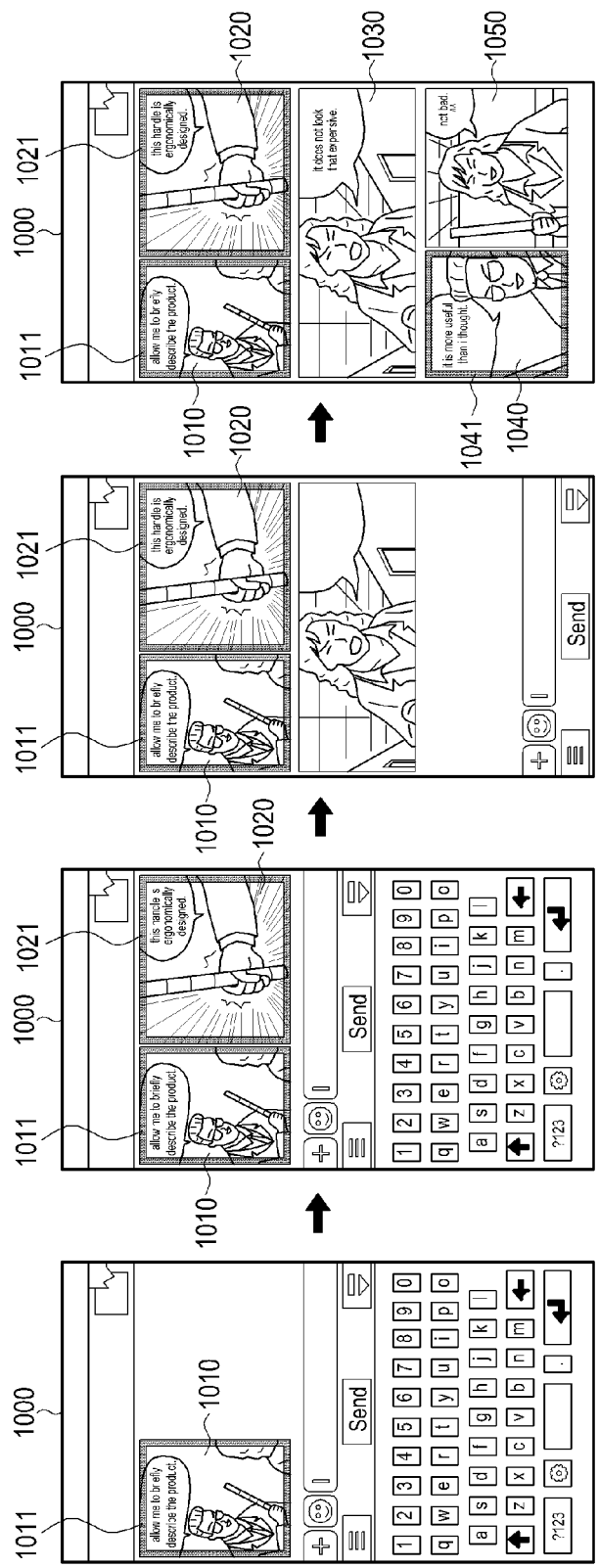
FIGS. 10 and 11 illustrate examples of screens in which a talker distinguisher is displayed in a cartoon cut according to an embodiment of the present disclosure.
Figure 11:
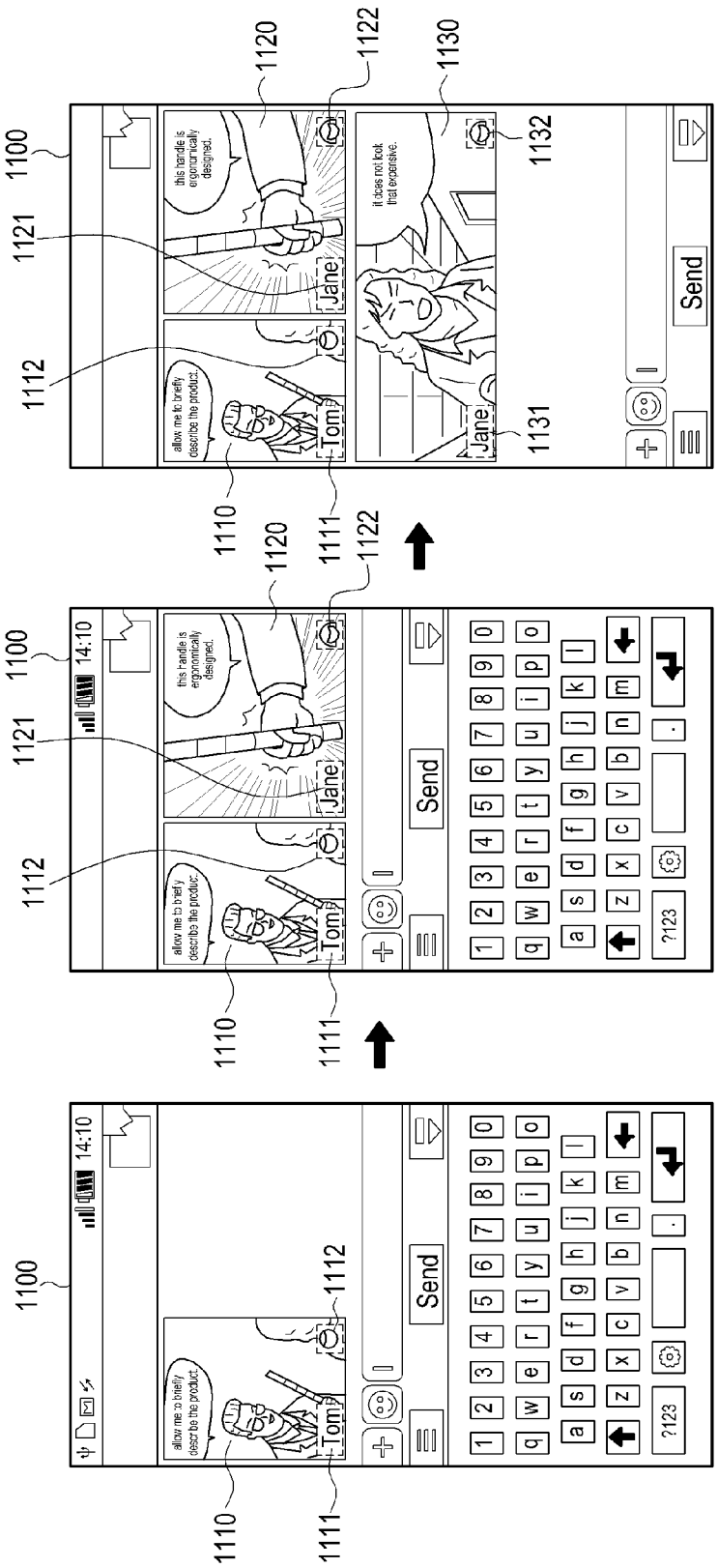

FIGS. 10 and 11 illustrate examples of screens in which a talker distinguisher is displayed in the cartoon cut according to an embodiment of the present disclosure.

Referring to FIG. 10, a talker of the cartoon cut image may be distinguished in various ways according to an embodiment of the present disclosure. According to various embodiments of the present disclosure, messages input by a user may be displayed emphatically in relation to messages input both another user. For example, the emphatic display of user messages relative to other user messages assists with identifying the source of each message.

For example, when a user A inputs a message and selects a first cartoon cut image 1010, the first cartoon cut image may be displayed in a messenger chat window 1000 so as to have an edge 1011 or be colored to be identified as an image input and selected by the user A. Accordingly, a second cartoon cut image 1020 and a fourth cartoon cut image 1040 corresponding to messages input by the user A may have the same edges 1021 and 1041 as the edges of the first cartoon cut image 1010 or the same color.

In contrast, a third cartoon cut image 1030 and a fifth cartoon cut image 1050 corresponding to messages input by a user B who is a chat counterpart of the user A may be indicated in a form or color different from the color of the cartoon cut images of the user A to be distinguished from the cartoon cut images of the user A.

Further, referring to FIG. 11, according to various embodiments of the present disclosure, the talkers may be distinguished in the messenger chat window 1100 by displaying user names or nicknames 1111, 1121, and 1131 on some areas of the cartoon cut images 1110, 1120, and 1130 or displaying images 1112, 1122, and 1132 selected or stored by the user, icons, avatars, and/or the like.

Figure 12:
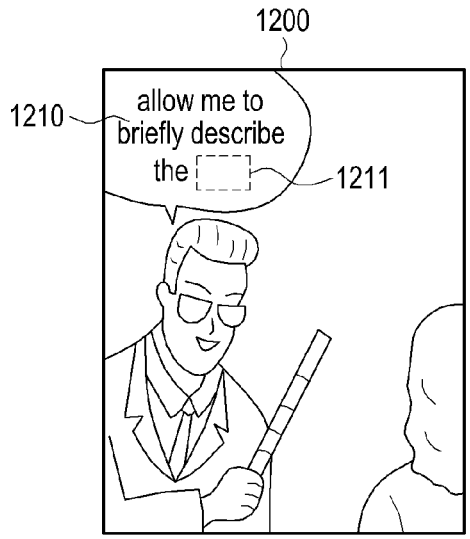
FIGS. 12, 13, and 14 illustrate examples of a method of displaying a text on a cartoon cut according to an embodiment of the present disclosure.
Figure 13:
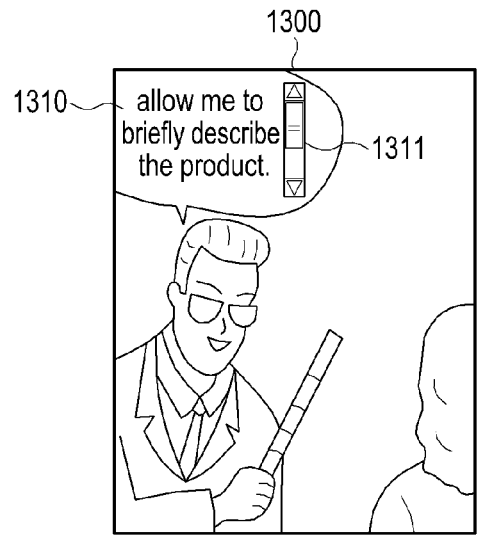
Figure 14:
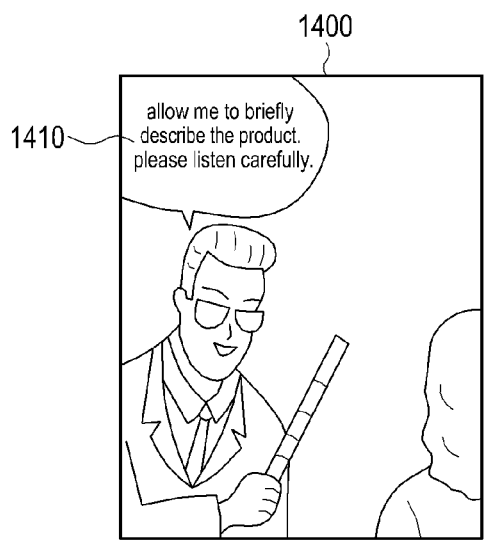

FIGS. 12, 13, and 14 illustrate examples of a method of displaying a text on the cartoon cut according to an embodiment of the present disclosure.

Referring to FIGS. 12 to 14, an input message may be added within the cartoon cut image in various ways.

Referring to FIG. 12, an input message may be added within a message displaying area 1210 (e.g., speech bubble area) of a selected cartoon cut image 1200. According to various embodiments of the present disclosure, when a length of the input message exceeds an input range, only a text having a preset length may be displayed and the remaining texts may be omitted as illustrated in FIG. 12. Further, ellipsis (e.g., " . . . ") 1211 which may indicate the existence of omitted texts may be additionally displayed. When the ellipsis 1211 or the speech bubble area is selected, entire contents of the message included in the speech bubble area may be displayed.

Referring to FIG. 13, an input message may be added within a message displaying area 1310 (e.g., speech bubble area) of a selected cartoon cut image 1300. According to various embodiments of the present disclosure, when a length of the input message exceeds an input range, only a text having a preset length may be displayed and the remaining texts may be identified through scrolling as illustrated in FIG. 13. A scroll bar 1311 which may scroll the text may be located at a predetermined position (e.g., a left or right side) of the message displaying area 1310.

Referring to FIG. 14, an input message may be added within a message displaying area 1410 (e.g., speech bubble area) of a selected cartoon cut image 1400. According to various embodiments of the present disclosure, when a length of the input message exceeds an input range, the entire message may be included in the message displaying area 1410 by resizing (e.g., reducing) a font size of the corresponding message as illustrated in FIG. 14.

Figure 15:
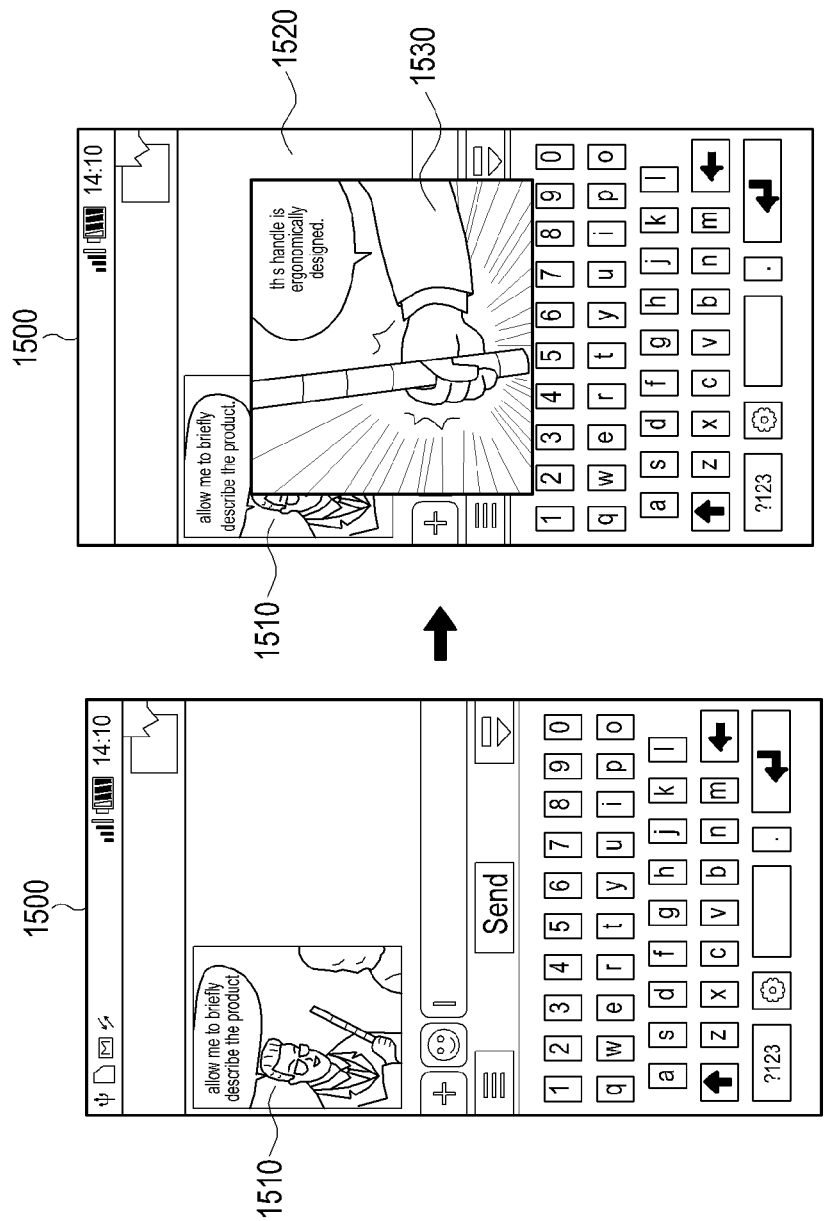
FIG. 15 illustrates an example of a screen displaying a received cartoon cut according to an embodiment of the present disclosure.

FIG. 15 illustrates an example of a screen displaying a received cartoon cut according to an embodiment of the present disclosure.

Referring to FIG. 15, when a cartoon cut image is generated in a messenger chat window 1500, various effects may be created on the screen. For example, a cartoon cut image input by the user may be expanded and displayed on the screen before the cartoon cut image is arranged, and a cartoon cut image input by a counterpart may be displayed in an expanded form for a predetermined time before the cartoon cut image is arranged on the screen as illustrated in FIG. 15.

For example, when a first cartoon cut image 1510 is displayed and then a second cartoon cut image 1530 is displayed, before the second cartoon cut image 1530 is arranged at an arrangement space 1520 in which the second cartoon cut image 1530 may be displayed, the corresponding cartoon cut image may be expanded and displayed on the screen as illustrated in FIG. 15, so that the user can identify message reception and readability may be increased.

Figure 16:
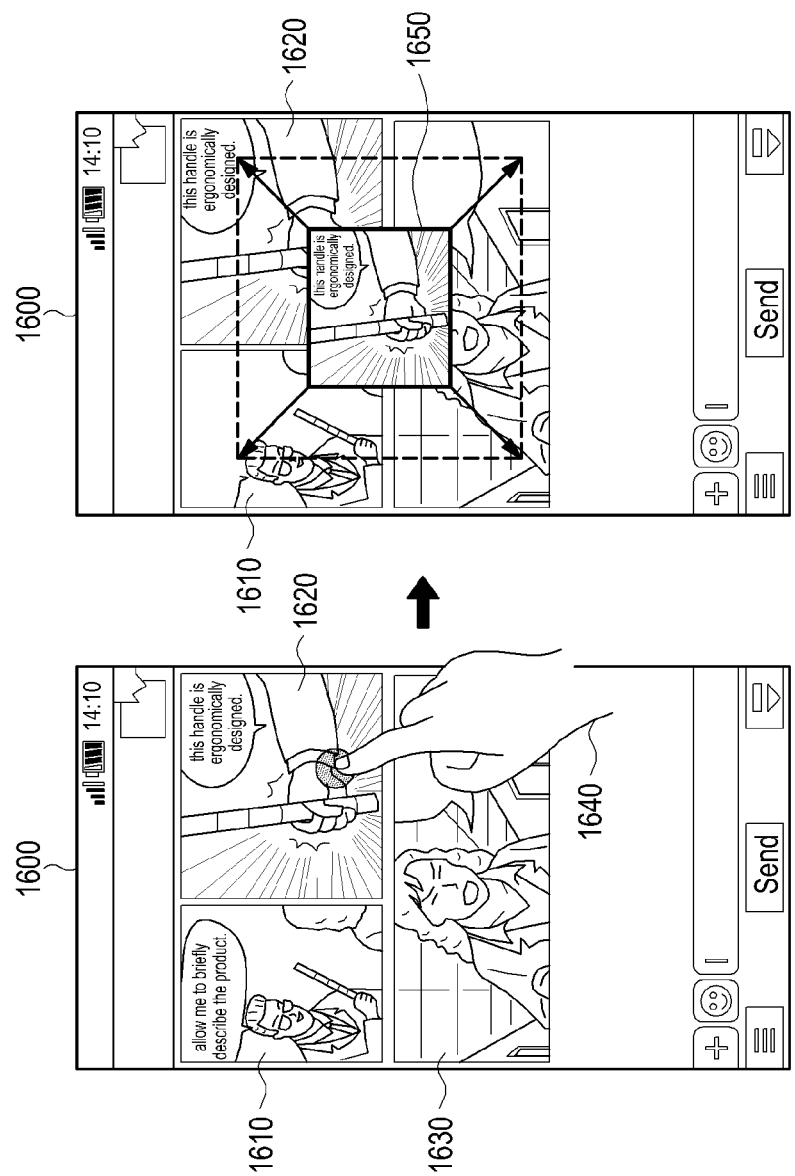
FIG. 16 illustrates an example of a screen expanding and displaying a selected cartoon cut according to an embodiment of the present disclosure.

FIG. 16 illustrates an example of a screen expanding and displaying a selected cartoon cut according to an embodiment of the present disclosure.

Referring to FIG. 16, when a cartoon cut image is generated in a messenger chat window 1600, various effects may be created on the screen. For example, when the user selects a particular cartoon cut image from the already arranged cartoon cut images, a visual effect can be increased by expanding the corresponding cartoon cut image and displaying the expanded carton cut image on the screen.

For example, when a first cartoon cut image 1610, a second cartoon cut image 1620, and a third cartoon cut image 1630 are sequentially displayed on the screen and then the user selects the second cartoon cut image 1620 the selected second cartoon cut image 1620 may be displayed as an expanded image 1650 on a center of the screen. According to various embodiments of the present disclosure, a cartoon cut image (e.g., the cartoon cut image 1620) may be selected using a hand 1640, an electronic pen, and/or the like.

When the selected cartoon cut image is an animation image, the animation may appear to move whenever the cartoon cut image is selected.

Figure 17:
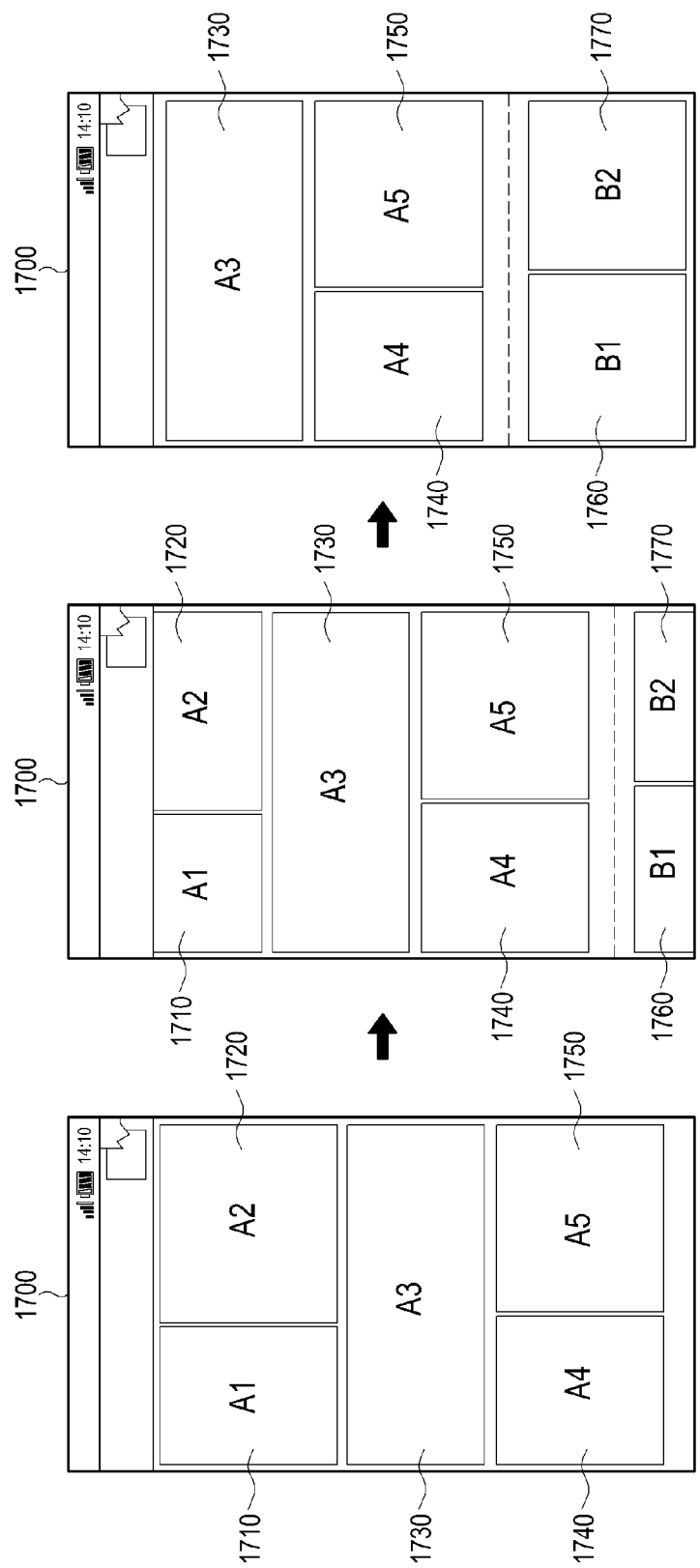
FIGS. 17 and 18 illustrate methods of switching a cartoon frame on a screen according to an embodiment of the present disclosure.
Figure 18:
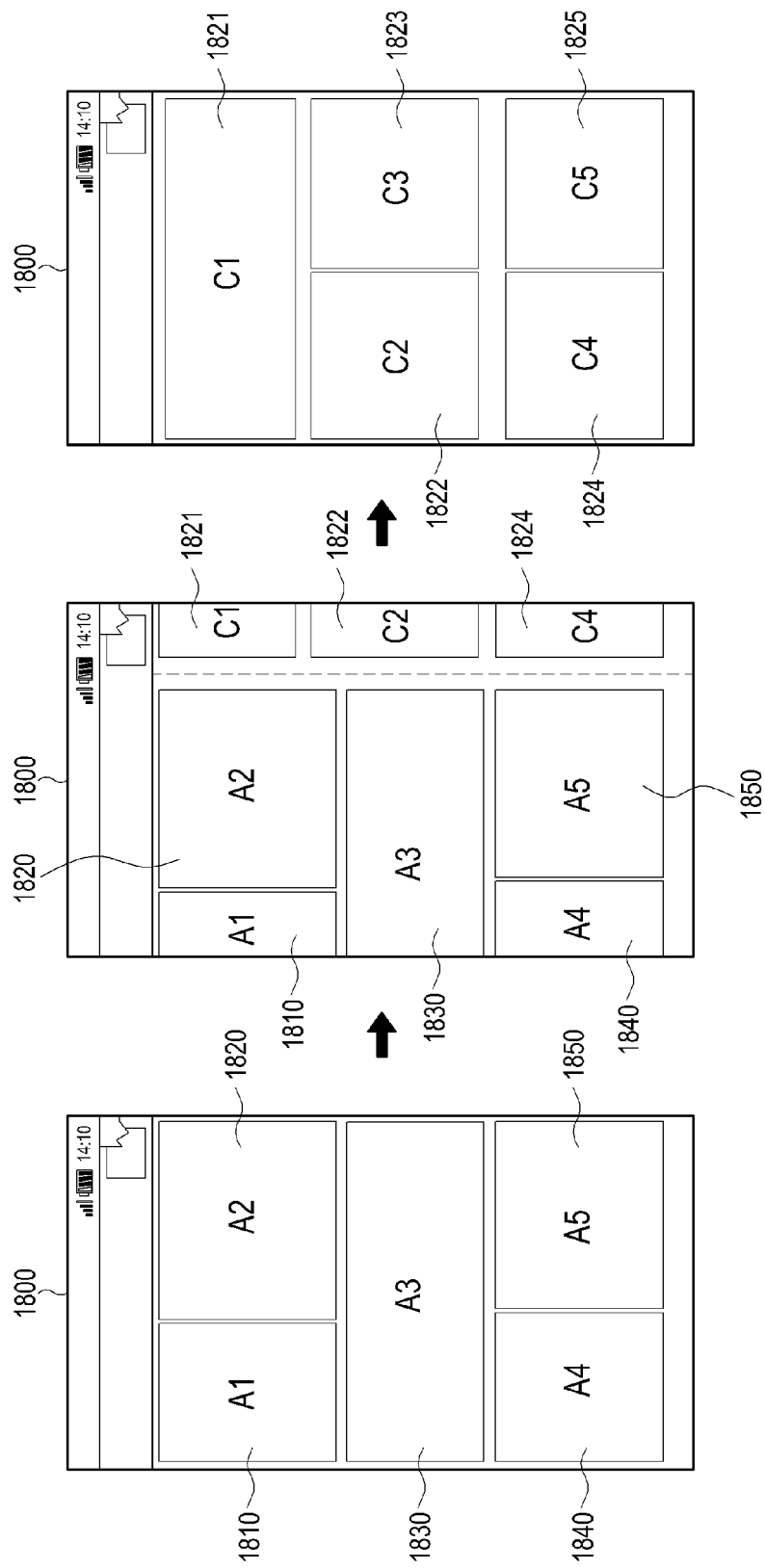

FIGS. 17 and 18 illustrate methods of switching a cartoon frame on the screen according to an embodiment of the present disclosure.

According to various embodiments of the present disclosure, when a plurality of cartoon cut images are arranged on a messenger chat window 1700 or 1800, in order to completely configure a plurality of cartoon frames, the user may switch a current cartoon frame to a next cartoon frame or a previous cartoon frame by scrolling the messenger chat window 1700 or 1800 on the screen. Through such an operation, the user can acquire an effect of viewing a comic book including the input messenger chat contents.

Referring to FIG. 17, when the user upwardly scrolls a cartoon frame A in the messenger window chat 1700 on the screen including five cartoon cut images (e.g., A1 1710, A2 1720, A3 1730, A4 1740, and A5 1750), the switching to a next cartoon frame B (cartoon frame including B1 1760 and B2 1770) may be made.

Referring to FIG. 18, when the user leftwardly scrolls the cartoon frame A in the messenger window chat 1800 on the screen including the five cartoon cut images (A1 1810, A2 1820, A3 1830, A4 1840, and A5 1850), the switching to a next cartoon frame C (cartoon frame including C1 1821, C2 1822, C3 1823, C4 1824, and C5 1825) may be made.

Figure 19:
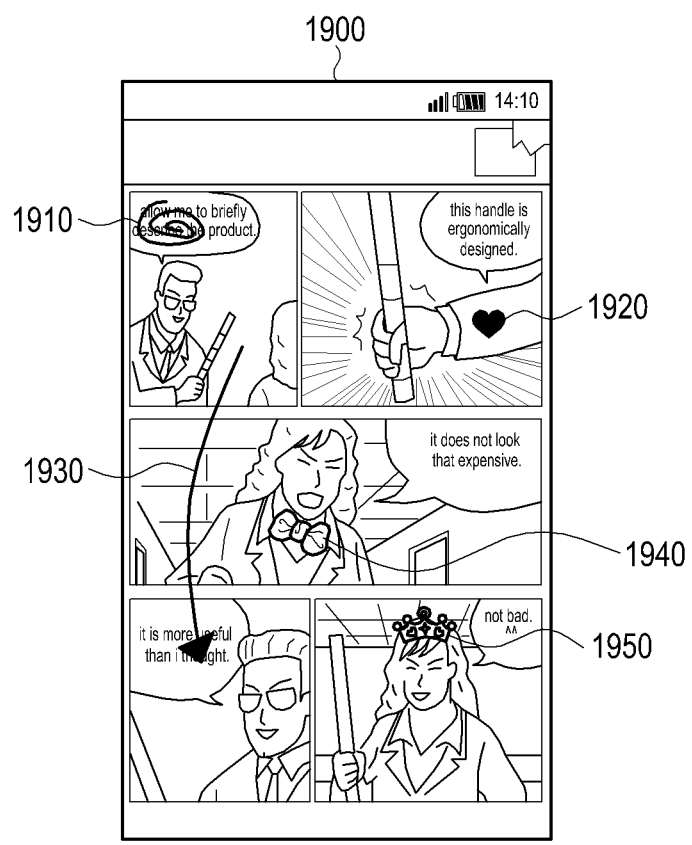
FIG. 19 illustrates an example of editing a cartoon cut image displayed on a screen according to an embodiment of the present disclosure.

FIG. 19 illustrates an example of editing a cartoon cut displayed on the screen according to an embodiment of the present disclosure.

Referring to FIG. 19, when a cartoon frame including a plurality of cartoon cut images is generated as described above, the generated cartoon frame may be edited in various ways.

For example, as illustrated in FIG. 19, with respect to a particular cartoon frame displayed on a messenger chat window 1900, various editing effects 1910, 1920, 1930, 1940, and 1950 such as drawing a line, inserting an icon, and/or the like using various image tools may be implemented.

Figure 20:
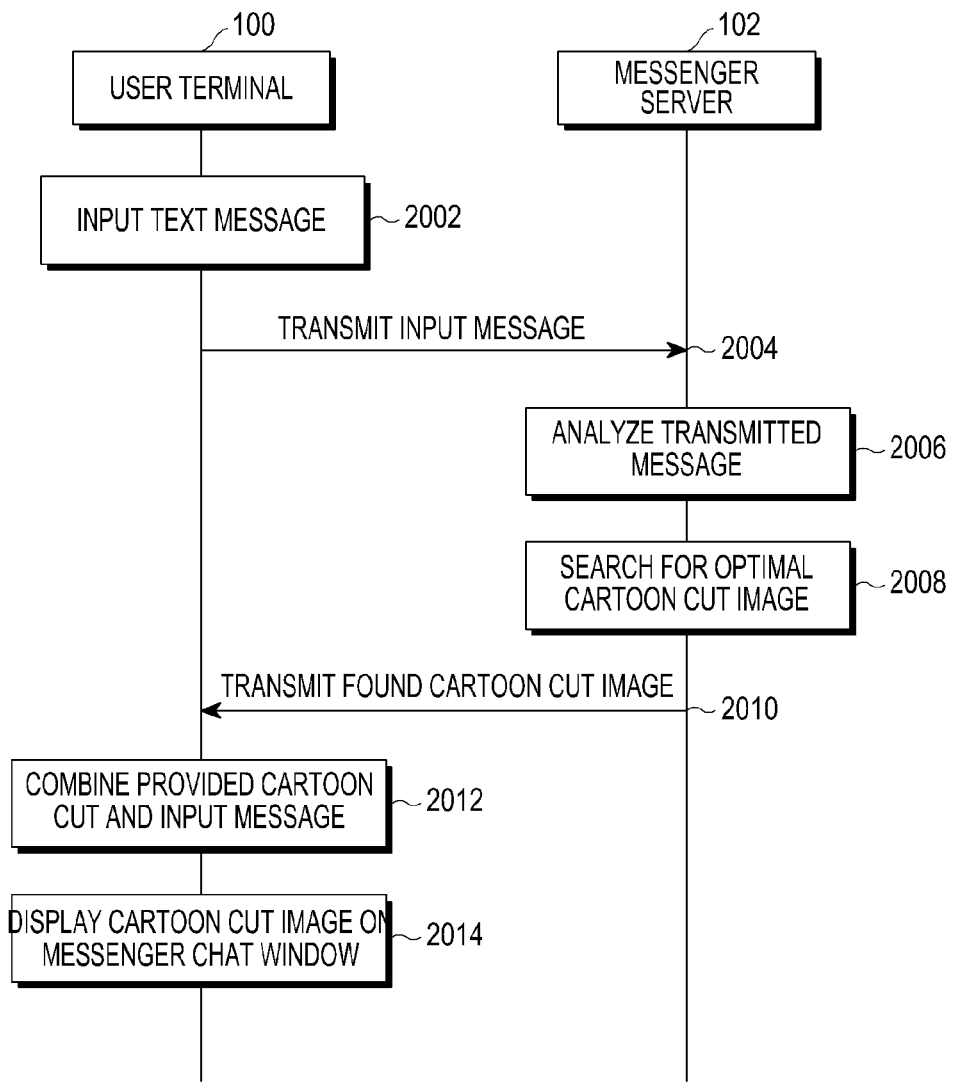
FIG. 20 is a signal flowchart illustrating a process of receiving a recommendation of a cartoon cut from a server according to an embodiment of the present disclosure.

FIG. 20 is a signal flowchart illustrating a process of receiving a recommendation of a cartoon cut image from a server according to an embodiment of the present disclosure.

Referring to FIG. 20, at operation 2002, the user terminal 100 inputs a message. For example, at operation 2002, the user terminal 100 inputs a message in a text form through the messenger chat window.

At operation 2004, the input message may be transmitted to the messenger server 102.

At operation 2006, the messenger server 102 may analyze the transmitted message.

At operation 2008, the messenger server 102 may search for an optimal cartoon cut image according to a result of the analysis.

At operation 2010, one or more found cartoon cut images may be transmitted to the user terminal 100.

At operation 2012, the user terminal 100 may select a particular cartoon cut image from the one or more transmitted cartoon cut images, and add or combine the input message with the selected cartoon cut image.

At operation 2014, the cartoon cut image to which the message has been added may be displayed on the messenger chat window.

Further, according to various embodiments of the present disclosure, the user terminal 100 may pre-store a plurality of cartoon cut images (e.g., a group of cartoon cuts including a plurality of cartoon cut images) and select an optimal cartoon cut from the pre-stored cartoon cut images when a message is input into the chat window.

Figure 21:
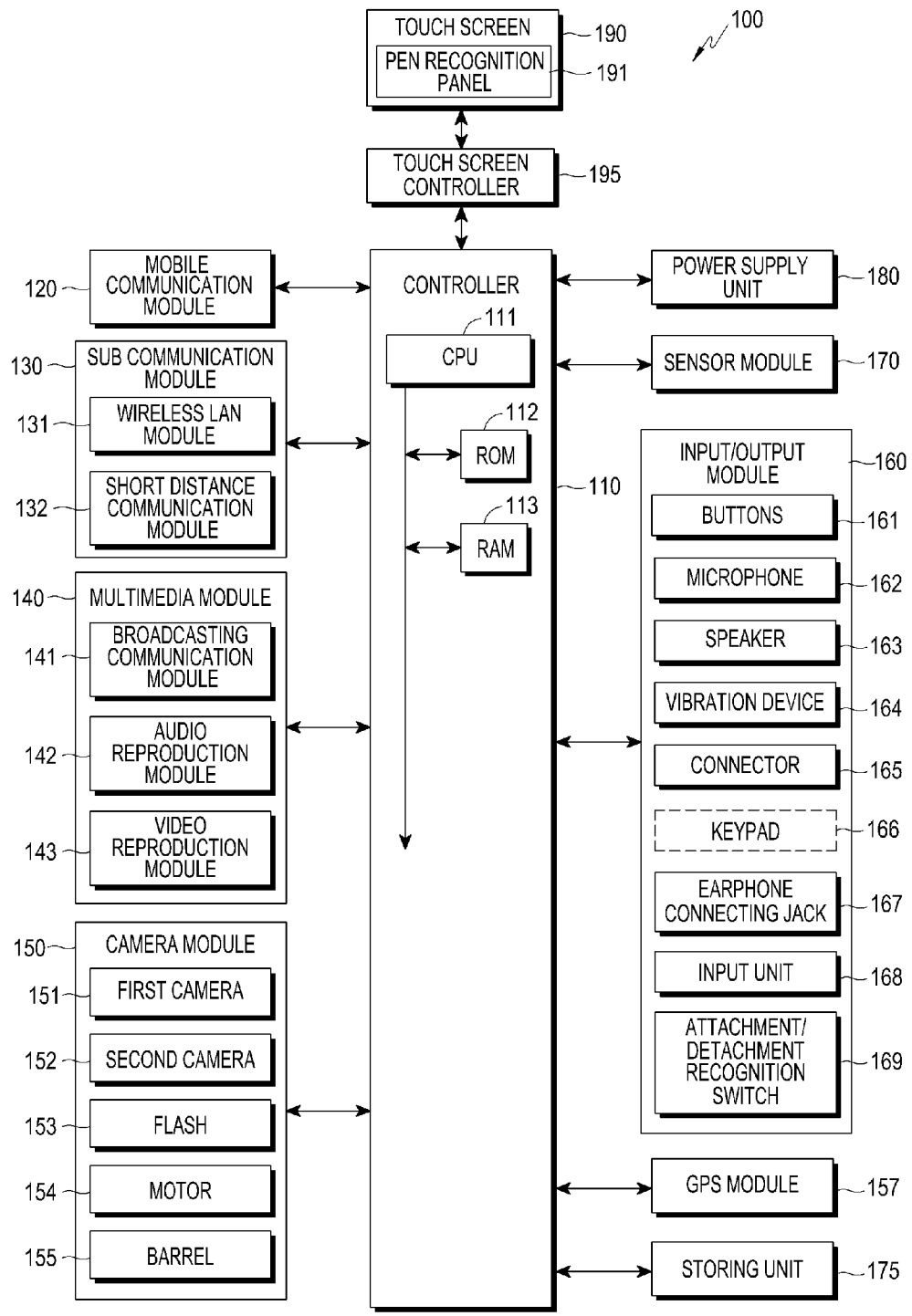
FIG. 21 is a block diagram illustrating a detailed structure of a user terminal according to an embodiment of the present disclosure.

FIG. 21 is a block diagram illustrating a detailed structure of a user terminal according to an embodiment of the present disclosure.

An example of the electronic device is a portable terminal (e.g., a mobile phone, a smart phone, and/or the like), and some of the components included in the electronic device described below may be omitted or changed as necessary.

Referring to FIG. 21, according to various embodiments of the present disclosure, the user terminal 100 include one or more of a controller 110, a mobile communication module 120, a sub communication module 130, a multimedia module 140, a camera module 150, an input/output module 160, a sensor module 170, a storage unit 175, a power supply unit 180, and a touch screen 190. According to various embodiments of the present disclosure, the user terminal 100 may include a state indicator (not shown), a Global Positioning System (GPS) module 157, a touch screen controller 195, and/or the like.

More specifically, the user terminal 100 may be connected with an external electronic device (not shown) by using at least one of the mobile communication module 120, a connector 165, an earphone connecting jack 167, and/or the like. Further, the user terminal 100 may be connected with another portable device or another electronic device (e.g., a mobile phone, a smart phone, a tablet PC, a desktop PC, a server, and/or the like through a cable connection, a wireless connection, and/or the like).

According to various embodiments of the present disclosure, the user terminal 100 may include a communication module (not shown). The communication module may include a broadcasting communication module.

The sub communication module 130 may include at least one of a wireless LAN module 131, a short distance communication module 132, and/or the like.

The multimedia module 140 may include at least one of a broadcasting communication module 141, an audio reproduction module 142, a video reproduction module 143, and/or the like.

The camera module 150 may include at least one of a first camera 151 and a second camera 152. Further, the camera module may further include a flash 153, a motor 154, a barrel 155, and/or the like.

The input/output module 160 may include at least one of a button 161, a microphone 162, a speaker 163, a vibration device 164, the connector 165, and a keypad 166.

The controller 110 may include a Central Processing Unit (CPU) 111, a Read Only Memory (ROM) 112 storing a control program for controlling the user terminal 100, and a Random Access Memory (RAM) 113 used as a storage area for storing a signal or data input from the outside of the electronic device 100 or for work performed in the user terminal 100. According to various embodiments of the present disclosure, the CPU 111 may include a various number of cores. For example, the CPU 111 may include a single core, a dual core, a triple core, a quadruple core, or the like. The CPU 111, the ROM 112, and the RAM 113 may be mutually connected to each other through an internal bus.

The controller 110 may control at least one of the mobile communication module 120, the multimedia module 140, the camera module 150, the input/output module 160, the sensor module 170, the storage unit 175, the power supply unit 180, the touch screen 190, and a touch screen controller 195.

Further, the controller 110 may detect a user input event such as a hovering event. For example, the controller 110 may detect a user input event such as a hovering event as an input device approaches the touch screen 190 or is located close to the touch screen 190. In addition, the controller 110 may detect various user inputs received through the camera module 150, the input/output module 160, and the sensor module 170, the touch screen 190, and/or the like. The user input may include various types of information input into the user terminal 100 such as a touch, a gesture, a voice, a pupil action, an iris recognition, and a bio signal of the user, and/or the like. The controller 110 may control a predetermined operation or function corresponding to the detected user input to be performed within the user terminal 100. Further, the controller 110 may output a control signal to the input unit 168 or the vibration device 164. The control signal includes information on a vibration pattern and the input unit 168 or the vibration device 164 generates a vibration according to the vibration pattern.

The user terminal 100 may include at least one of the mobile communication module 121, the wireless LAN module 131, and the short distance communication module 132 according to a capability thereof.

The mobile communication module 121 enables the user terminal 100 to be connected with an external electronic device through mobile communication by using one or more antennas (not shown) according to a control of the controller 110. The mobile communication module 121 may transmit/receive a wireless signal for a voice call, a video call, a Short Message Service (SMS), or a Multimedia Message Service (MMS) to/from a mobile phone (not shown), a smart phone (not shown), a tablet PC, or another electronic device (not shown) (e.g., having a phone number input into the user terminal 100).

The sub communication module 130 may include at least one of the wireless LAN module 131 and the short distance communication module 132. For example, the sub communication module 130 includes only the wireless LAN module 131, only the short distance communication module 132, or both the wireless LAN module 131 and the short distance communication module 132.

The wireless LAN module 131 may be connected to the Internet in a place at which a wireless Access Point (AP) (not shown) is installed according to a control of the controller 110. The wireless LAN module 131 may support a wireless LAN standard (e.g., IEEE802.11x) of the Institute of Electrical and Electronics Engineers (IEEE). The short distance communication module 132 may wirelessly perform short distance communication between the user terminal 100 and an external electronic device according to a control of the controller 110. A short distance communication scheme may include Bluetooth, IrDA communication, WiFi-Direct communication, Near Field Communication (NFC), and/or the like.

The broadcasting communication module 141 may receive a broadcasting signal (e.g., a TV broadcasting signal, a radio broadcasting signal, a data broadcasting signal, and/or the like) and broadcasting supplement information (e.g., Electric Program Guide (EPG), Electric Service Guide (ESG), and/or the like) output from a broadcasting station through a broadcasting communication antenna (not shown) according to a control of the controller 110. The broadcasting communication module 141 may be included in or separate from the multimedia module 140.

The multimedia module 140 may include the audio reproduction module 142 or the video reproduction module 143. The audio reproduction module 142 may reproduce a digital audio file (e.g., a file having a file extension of mp3, wma, ogg, way, and/or the like) stored or received according to a control of the controller 110. The video reproduction module 143 may reproduce a digital video file (e.g., a file having a file extension of mpeg, mpg, mp4, avi, mov, mkv, and/or the like) stored or received according to a control of the controller 110. The multimedia module 140 may be integrated in the controller 110.

The camera module 150 may include at least one of the first camera 151 and the second camera 152 that photographs a still image, a video, or a panorama picture according to a control of the controller 110. Further, the camera module 150 may include at least one of the barrel 155 performing a zoom-in/out for photographing the subject, the motor 154 controlling a motion of the barrel 155, and the flash 153 providing an auxiliary light source required for photographing the subject. The first camera 151 may be disposed on a front surface of the apparatus 100, and the second camera 152 may be disposed on a back surface of the user terminal 100.

The input/output module 160 may include at least one of at least one button 161, at least one microphone 162, at least one speaker 163, at least one vibration device 164, the connector 165, a keypad 166, the earphone connection jack 167, and the input unit 168. According to various embodiments of the present disclosure, the input/output module 160 is not limited thereto. For example, the input/output module may additionally or alternatively include a mouse, a trackball, a joystick, a cursor control such as cursor direction keys, and/or the like for controlling a motion of a cursor on the touch screen 190. According to various embodiments of the present disclosure, the input/output module 160 may include an attachment/detachment recognition switch 169.

The button 161 may be formed on a front surface, a side surface, or a back surface the housing of the user terminal 100, and may include at least one of a power/lock button, a volume button, a menu button, a home button, a back button, and a search button. The microphone 162 receives a voice or a sound to generate an electrical signal according to a control of the controller 110. The speaker 163 can output sounds corresponding to various signals or data (e.g., wireless data, broadcasting data, digital audio data, digital video data and the like) to the outside of the user terminal 100 according to a control of the controller 110. The speaker 163 may output a sound (e.g., button tone corresponding to phone communication, ringing tone, and a voice of another user) corresponding to a function performed by the user terminal 100. One or more speakers 163 may be formed at a proper position or positions of the housing of the user terminal 100.

The vibration device 164 may convert an electrical signal to a mechanical vibration according to a control of the controller 110. For example, when the user terminal 100 is in a vibration mode and receives a voice or video call from another device (not shown), the vibration device 164 is operated. One or more vibration devices 164 may be formed within the housing of the user terminal 100. The vibration device 164 may operate in accordance with a user input through the touch screen 190.

The connector 165 may be used as an interface for connecting the portable user terminal 100 with an external electronic device or a power source (not shown). The controller 110 may transmit or receive data stored in the storage unit 175 of the user terminal 100 to or from an external electronic device through a wired cable connected to the connector 165. The user terminal 100 may receive power from the power source through the wired cable connected to the connector 165 or charge a battery (not shown) by using the power source.

The keypad 166 may receive a key input from the user so as to control the user terminal 100. The keypad 166 may include a physical keypad (not shown) formed in the user terminal 100 or a virtual keypad (not shown) displayed on the touch screen 190. The physical keypad (not shown) formed in the user terminal 100 may be excluded according to a capability or structure of the user terminal 100. An earphone (not shown) may be inserted into the earphone connecting jack 167 to be connected with the user terminal 100.

The input unit 168 may be inserted into the inside of the user terminal 100 and withdrawn or separated from the user terminal 100 when being used. An attachment/detachment recognition switch 169 which operates in accordance with an installation and attachment/detachment of the input unit 168 may be located in one area within the user terminal 100 into which the input unit 168 is inserted, and the attachment/detachment recognition switch 169 may output signals corresponding to the installation and separation of the input unit 168 to the controller 110. The attachment/detachment recognition switch 169 may be configured to directly/indirectly contact the input unit 168 when the input unit 168 is mounted. Accordingly, the attachment/detachment recognition switch 169 may generate a signal corresponding to the installation or the separation of the input unit 168 (e.g., a signal informing of the installation or the separation of the input unit 168) and output the generated signal to the controller 110 based on whether the attachment/detachment recognition switch 169 contacts the input unit 168.

The sensor module 170 includes at least one sensor that detects the status of the user terminal 100. For example, the sensor module 170 may include at least one of a proximity sensor for detecting whether the user approaches the user terminal 100, an illumination sensor (not shown) for detecting an amount of ambient light of the user terminal 100, a motion sensor (not shown) for detecting a motion (e.g., rotation, acceleration, vibration, and/or the like of the user terminal 100) of the user terminal 100, a geo-magnetic sensor for detecting a point of the compass by using the Earth's magnetic field, a gravity sensor for detecting a gravity action direction, an altimeter for measuring an atmospheric pressure to detect an altitude, and/or the like. The sensor module 170 may also include the GPS module 157.

The GPS module 157 may receive radio waves from a plurality of GPS satellites (not shown) in Earth's orbit and may calculate a position of the user terminal 100 by using Time of Arrival from the GPS satellites to the user terminal 100.

The storage unit 175 may store a signal or data input/output according to the operation of the communication module 120, the multimedia module 140, the camera module 150, the input/output module 160, the sensor module 170, the touch screen 190, and/or the like. Further, according to various embodiment of the present disclosure, the storage unit 175 may store various state information and setting information of the user terminal 100.

The storage unit 175 may store a control program and applications for controlling the user terminal 100 or the controller 110. One of the control program or the applications may be a messenger client application installed according to various embodiment of the present disclosure.

The term "storage unit" may be used as a term which refers to a random data storage device such as the storage unit 175, the ROM 112 or the RAM 113 within the controller 110, or a memory card (e.g., an SD card or a memory stick) installed in the user terminal 100. The storage unit 175 may include a non-volatile memory, a volatile memory, a Hard Disk Drive (HDD), a Solid State Drive (SSD), and/or the like.

Further, the storage unit 175 may store applications having various functions such as a navigation function, a video call function, a game function, and a time based alarm function, images for providing a Graphical User Interface (GUI) related to the applications, databases or data related to a method of processing user information, a document, and a touch input, background images (e.g., a menu screen, an idle screen or the like) or operating programs required for driving the electronic device 100, and images photographed by the camera module 150.

The storage unit 175 is a non-transitory machine-readable medium (e.g., a non-transitory computer-readable medium), and the term non-transitory machine-readable medium may be defined as a medium for providing data to the machine to perform a specific function. The storage unit 175 may include a non-volatile medium and a volatile medium. All of these media may be a tangible type that allows the commands transferred by the media to be detected by a physical instrument in which the machine reads the commands into the physical instrument.

The non-transitory machine-readable medium includes at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), a flash-EPROM, and/or the like. However, various embodiments of the present disclosure are not limited thereto.

The power supply unit 180 may supply power to one battery or a plurality of batteries arranged at the housing of the user terminal 100 according to a control of the controller 110. The one or more batteries supply power to the user terminal 100. Further, the power supply unit 180 may supply power input from an external power source through a wired cable connected to the connector 165 to the user terminal 100. In addition, the power supply unit 180 may supply power wirelessly input from the external power source through a wireless charging technology to the user terminal 100.

The user terminal 100 may include at least one touch screen 190 providing user graphical interfaces corresponding to various services (e.g., a phone call, data transmission, broadcasting, photography, and/or the like) to the user. The touch screen 190 may output an analog signal corresponding to at least one user input into the user graphical interface to the touch screen controller 195.

The touch screen 190 may receive at least one user input through a user's body (e.g., fingers including a thumb, and/or the like) or the input unit 168 (e.g., a stylus pen, an electronic pen, and/or the like). The touch screen 190 may be implemented in a resistive type, a capacitive type, an infrared type, an acoustic wave type, and/or the like, or a combination thereof.

Further, the touch screen 190 may include at least two touch panels which can detect touches or approaches of the finger and the input unit 168, respectively, in order to receive inputs of the finger and the input unit 168, respectively. The two or more touch panels provide different output values to the touch screen controller 195. Then, the touch screen controller 195 can recognize the different values input to the two or more touch panels to distinguish whether the input from the touch screen 190 is an input by the finger or an input by the input unit 168.

In addition, the touch is not limited to a touch between the touch screen 190 and the user's body or touchable input means. For example, the touch may include a non-contact (e.g., a case in which an interval between the touch screen 190 and the user's body or touchable input means is 1 mm or shorter). The detectable interval of the touch screen 190 may be changed according to a capability, configuration, or structure of the user terminal 100, or according to user settings.

The touch screen controller 195 converts an analog signal received from the touch screen 190 to a digital signal and transmits the converted digital signal to the controller 110. The controller 110 can control the touch screen 190 by using the digital signal received from the touch screen controller 195. The touch screen controller 195 can identify a hovering interval or distance as well as a position of the user input by detecting a value (e.g., a current value or the like) output through the touch screen 190, convert the identified distance value to a digital signal (e.g., a Z coordinate), and then provide the converted digital signal to the controller 110. Further, the touch screen controller 190 can detect a pressure applied to the touch screen 190 by the user input means by detecting the value (e.g., the current value, and/or the like) output through the touch screen 190, convert the identified pressure value to a digital signal, and then provide the converted digital signal to the controller 110.

As described above, although the present disclosure has described the specific matters such as concrete components, the limited embodiments, and the drawings, they are provided merely to assist general understanding of the present disclosure and the present disclosure is not limited to the embodiments. Various modifications and changes can be made from the description by those skilled in the art.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a memory configured to store instructions therein;
   a display configured to display one or more chat contents on a chat window; and
   at least one processor configured, upon execution of the instructions, to:
   receive a selection of a cartoon cut image selected within a cartoon image group including a plurality of cartoon cut images, and
   control the display to display the selected cartoon cut image and the chat contents on the display,
   wherein the cartoon cut image is displayed according to the one or more chat contents, and
   wherein the cartoon cut images are sequentially displayed in parallel, horizontally across a line of the chat window.

2. The electronic device of claim 1, wherein the at least one processor is further configured to, when a cartoon image group including a plurality of cartoon cut images is selected and a cartoon cut image is selected within the selected cartoon image group according to an input of the chat contents, control to display the input chat contents in at least a part of the selected cartoon cut image on the display.

3. The electronic device of claim 2, wherein the at least one processor is further configured to:
   analyze the input chat contents,
   recommend one or more cartoon cut images within the cartoon image group according to a result of the analysis, and
   control to select one cartoon cut image from the one or more recommended cartoon cut images.

4. The electronic device of claim 2, further comprising a transceiver configured to:
   transmit the input chat content to a message server, and
   receive one or more cartoon cut images related to the transmitted chat contents from the message server.

5. The electronic device of claim 2, wherein at least the part of the selected cartoon cut image corresponds to an area displayed in a speech bubble form.

6. The electronic device of claim 1, wherein the plurality of cartoon cut images included in the cartoon image group correspond to images having different sizes.

7. The electronic device of claim 1, wherein the at least one processor is further configured to:
   determine whether a previously displayed cartoon cut image exists in the chat window,
   determine whether the previously displayed cartoon cut image can be arranged on a line of an immediately preceding displayed cartoon cut image when the previously displayed cartoon cut image is determined to exist in the chat window, and
   arrange the cartoon cut image to be displayed on the line of the immediately preceding displayed cartoon cut image when the previously displayed cartoon cut image is determined to be able to be arranged on the line of the immediately preceding displayed cartoon cut image.

8. The electronic device of claim 1, wherein the at least one processor is further configured to:
   determine whether a previously displayed cartoon cut image exists in the chat window,
   determine whether an arrangement space exists on a line of an immediately preceding displayed cartoon cut image when the previously displayed cartoon cut image is determined to exist in the chat window, and
   arrange a preset advertisement image at an arrangement space when the previously displayed cartoon cut image is determined to be unable to be arranged on the line of the immediately preceding displayed cartoon cut image.

9. The electronic device of claim 1, wherein the cartoon cut image displayed on the chat window additionally has a user indicator by at least one of a color, an edge, an icon, an avatar, an image, a nickname, or a name.

10. The electronic device of claim 2, wherein the at least one processor is further configured to, when an entire length of the input chat contents exceeds a length which can be displayed on a chat content displaying area of the selected cartoon cut image, control to display a subset of the chat content selected from the input chat contents.

11. The electronic device of claim 10, wherein the at least one processor is further configured to, when the subset of the chat content selected from the input chat content is displayed, add an indication indicating that the subset of the chat content is displayed within the chat content displaying area.

12. The electronic device of claim 10, wherein the at least one processor is further configured to, when the subset of the chat content selected from the received chat content is displayed, add a scroll bar which can scroll the chat content within the chat content displaying area.

13. The electronic device of claim 2, wherein the at least one processor is further configured to, when an entire length of the input chat contents exceeds a length which can be displayed on a message displaying area of the selected cartoon cut image, scale and display a font size of the input chat contents.

14. An electronic device comprising:
a memory configured to store instructions therein;
a display configured to display one or more chat contents on a chat window; and
at least one processor configured, upon execution of the instructions, to:
receive a selection of a cartoon frame in which a plurality of cartoon cut images are arranged in a preset order and chat contents are input through the chat window,
sequentially select cartoon cut images from the selected cartoon frame according to the order of the arrangement of the plurality of cartoon cut images, and
control to display the selected cartoon cut images and the input chat contents on the display,
wherein the cartoon cut images are displayed according to the one or more chat contents, and
wherein the cartoon cut images are displayed in order, in parallel, and horizontally across a line of the chat window.

15. A method of displaying a message on a chat window, the method comprising:
selecting a cartoon image group including a plurality of cartoon cut images;
receiving a chat content;
selecting a cartoon cut image from the selected cartoon cut image group; and
displaying the selected cartoon cut image including the received chat content in some areas of the selected cartoon cut image on a messenger chat window,
wherein the cartoon cut image is displayed according to the chat content, and
wherein the cartoon cut images are sequentially displayed in parallel, horizontally across a line of the messenger chat window.

16. The method of claim 15, wherein the selecting of the cartoon cut image comprises:
analyzing the received chat content;
recommending one or more cartoon cut images from among the cartoon image group according to a message analysis result; and
selecting one or more cartoon cut images from the recommended one or more cartoon cut images.

17. The method of claim 15, wherein the selecting of the cartoon cut image comprises:

transmitting the received chat content to a messenger server;
receiving one or more cartoon cut images related to the transmitted content from the messenger server; and
selecting one or more cartoon cut images from the received one or more cartoon cut images.

18. The method of claim 15, wherein the some areas of the selected cartoon cut image on the messenger chat window correspond to areas indicated in a speech bubble form.

19. The method of claim 15, wherein the plurality of cartoon cut images included in the cartoon image group correspond to images having at least one of different sizes or different shapes.

20. The method of claim 15, wherein the displaying of the selected cartoon cut image on the messenger chat window comprises:
determining whether a previously displayed cartoon cut image exists in the messenger chat window;
when the previously displayed cartoon cut image is determined to exist in the messenger chat window, determining whether the previously displayed cartoon cut image can be arranged on a line of an immediately preceding displayed cartoon cut image; and
when the previously displayed cartoon cut image is determined to be able to be arranged on the line of the immediately preceding displayed cartoon cut image, arranging the cartoon cut image to be displayed on the line the immediately preceding displayed cartoon cut image.

21. The method of claim 15, wherein the displaying of the cartoon cut image on the messenger chat window comprises:
determining whether a previously displayed cartoon cut image exists in the messenger chat window;
when the previously displayed cartoon cut image is determined to exist in the messenger chat window, determining whether an arrangement space exists on a line of immediately preceding displayed cartoon cut image; and
when the arrangement space exists on the line of the immediately preceding displayed cartoon cut image but the cartoon cut image to be displayed cannot be arranged at the arrangement space, arranging a preset advertisement image at the arrangement space.

22. The method of claim 15,
wherein a user communicating in the messenger chat window is distinguished according to a user indicator that is added to the cartoon cut image displayed on the messenger chat window, and
wherein the user indicator comprises at least one of a color, an edge, an icon, an avatar, an image, a nickname, or a name.

23. The method of claim 15, wherein the displaying of the selected cartoon cut image including the received chat content in some areas of the selected cartoon cut image on the messenger chat window comprises:
displaying, when an entire length of the received chat content exceeds a length which can be displayed on a chat content displaying area of the selected cartoon cut image, a subset of the chat content selected from the received chat content.

24. The method of claim 23, wherein the displaying of the selected cartoon cut image including the received chat content in some areas of the selected cartoon cut image on the messenger chat window further comprises:
displaying, when the subset of the chat content selected from the received chat content is displayed, an indication indicating that the subset of the chat content is displayed within the chat content displaying area.

25. The method of claim 23, wherein the displaying of the selected cartoon cut image including the received chat content in some areas of the selected cartoon cut image on the messenger chat window further comprises:
displaying, when the subset of the chat content selected from the received chat content is displayed, a scroll bar which can scroll the chat content within the chat content displaying area.

26. The method of claim 15, wherein the displaying of the selected cartoon cut image including the received chat content in some areas of the selected cartoon cut image on the messenger chat window comprises:
scaling, when an entire length of the received chat content exceeds a length which can be displayed on a message displaying area of the selected cartoon cut image, a font size of the received chat content, and
displaying the received chat content having the scaled font size.

27. A method of displaying a message on a chat window, the method comprising:
selecting a cartoon frame in which a plurality of cartoon cut images are arranged in a preset order;
inputting a chat content into a messenger chat window;
sequentially selecting cartoon cut images from the selected cartoon frame according to an order of the arrangement of the plurality of cartoon cut images; and
displaying the selected cartoon cut image including the input chat content in some areas of the selected cartoon cut image on the messenger chat window,
wherein the cartoon cut image is displayed according to the chat content, and
wherein the cartoon cut images are sequentially displayed in parallel, horizontally across a line of the chat window.

28. The method of claim 27, wherein the some areas of the selected cartoon cut image on the messenger chat window correspond to areas indicated in a speech bubble form.

29. The method of claim 27, wherein the plurality of cartoon cut images included in the cartoon image group correspond to images having at least one of different sizes or different shapes.

30. The method of claim 27,
wherein a user communicating in the messenger chat window is distinguished according to a user indicator that is added to the cartoon cut image displayed on the messenger chat window, and
wherein the user indicator comprises at least one of a color, an edge, an icon, an avatar, an image, a nickname, or a name.

31. The method of claim 27, wherein the displaying of the selected cartoon cut image including the input chat content in some areas of the selected cartoon cut image on the messenger chat window comprises:
displaying, when an entire length of the input chat content exceeds a length of a message which can be displayed on a chat content displaying area of the selected cartoon cut image, a subset of the chat content selected from the input chat content.

32. The method of claim 31, wherein the displaying of the selected cartoon cut image including the input chat content in some areas of the selected cartoon cut image on the messenger chat window further comprises:
displaying, when the subset of the chat content selected from the input chat content is displayed, an indication indicating that the subset of the chat content is displayed within the chat content displaying area.

33. The method of claim 31, wherein the displaying of the selected cartoon cut image including the input chat content in some areas of the selected cartoon cut image on the messenger chat window further comprises:
displaying, when the subset of the chat content selected from the input chat content is displayed, a scroll bar which can scroll the chat content within the chat content displaying area.

34. The method of claim 27, wherein the displaying of the selected cartoon cut image including the input chat content in some areas of the selected cartoon cut image on the messenger chat window comprises:
scaling, when an entire length of the input chat content exceeds a length which can be displayed on a message displaying area of the selected cartoon cut image, a font size of the input chat content, and
displaying the input chat content having the scaled font size.

35. A non-transitory computer-readable recording medium recording a program for performing, when executed, the method of claim 1.

36. A method of displaying a conversation on a chat window in an electronic device, the method comprising:
receiving an input message;
selecting a cartoon cut image to be displayed in association with the received input message; and
displaying the selected cartoon cut image and the received input message in a messenger chat window,
wherein the cartoon cut image is displayed according to the input message, and
wherein the cartoon cut images are sequentially displayed in parallel, horizontally across a line of the chat window.

37. The method of claim 36, wherein the displaying of the selected cartoon cut image and the received input message in the messenger chat window comprises:
displaying the selected cartoon cut image and the received input message in association with each other.

38. The method of claim 36, further comprising:
determining an area of the messenger chat window in which the selected cartoon cut image and the received input message are to be displayed.

39. The method of claim 38, wherein the determining of the area of the messenger chat window in which the selected cartoon cut image and the received input message are to be displayed comprises:
determining the area according to at least one of a user from which the input message is received, a size of the received message, a size of the selected cartoon cut image, a shape of the selected cartoon cut image, a position of a previously displayed message, or a position of a displayed advertisement.

* * * * *